(12) United States Patent
Damnjanovic et al.

(10) Patent No.: US 9,345,047 B2
(45) Date of Patent: May 17, 2016

(54) TECHNIQUES FOR ASSESSING CLEAR CHANNEL IN AN UNLICENSED RADIO FREQUENCY SPECTRUM BAND

(71) Applicant: QUALCOMM Incorporated, San Diego, CA (US)

(72) Inventors: Aleksandar Damnjanovic, Del Mar, CA (US); Naga Bhushan, San Diego, CA (US); Wanshi Chen, San Diego, CA (US); Tao Luo, San Diego, CA (US); Tingfang Ji, San Diego, CA (US); Yongbin Wei, San Diego, CA (US); Durga Prasad Malladi, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 14/341,135

(22) Filed: Jul. 25, 2014

(65) Prior Publication Data

US 2015/0098397 A1 Apr. 9, 2015

Related U.S. Application Data

(60) Provisional application No. 61/887,318, filed on Oct. 4, 2013.

(51) Int. Cl.
*H04W 74/08* (2009.01)
*H04W 74/00* (2009.01)
(Continued)

(52) U.S. Cl.
CPC ............. *H04W 74/08* (2013.01); *H04W 16/14* (2013.01); *H04W 72/0453* (2013.01);
(Continued)

(58) Field of Classification Search
None
See application file for complete search history.

(56) References Cited

U.S. PATENT DOCUMENTS

2008/0084835 A1 4/2008 Goel et al.
2015/0327297 A1* 11/2015 Nilsson ............ H04W 72/1215
370/336

FOREIGN PATENT DOCUMENTS

WO WO-2010099497 A1 9/2010
WO WO-2012049533 A1 4/2012

OTHER PUBLICATIONS

ETSI, "Broadband Radio Access networks (BRAN); 5 GHz High Performance RLAN; Harmonized EN Covering the Essential Requirements of Article 3.2 of the R&TTE Directive," ETSI EN 301 893 v1.7.1, Jun. 2012, 88 pgs., European Telecommunications Standards Institute, Sophia-Antipolis Cedex; France.
(Continued)

*Primary Examiner* — Ashley Shivers
(74) *Attorney, Agent, or Firm* — Holland & Hart LLP

(57) ABSTRACT

Techniques are described for wireless communications utilizing multiple clear channel assessment (CCA) procedures for access to a radio frequency spectrum band. A first CCA procedure is performed to determine availability of the radio frequency spectrum band and to contend for use of the radio frequency spectrum band among a number of coordinated operators transmitting on the radio frequency spectrum band. A successful first CCA procedure results in winning the contention for the radio frequency spectrum band for a transmission period that is coordinated among the number of coordinated operators. Upon the successful first CCA procedure, a second CCA procedure is performed during a discontinuous transmission (DTX) period in the transmission period to determine continued availability of the radio frequency spectrum band. The timing of the DTX periods is determined based on timing of radio transmissions having priority use of the radio frequency spectrum band.

30 Claims, 20 Drawing Sheets

(51) Int. Cl.
  *H04W 16/14* (2009.01)
  *H04W 72/04* (2009.01)
  *H04W 72/06* (2009.01)
  *H04W 76/00* (2009.01)
  *H04W 28/08* (2009.01)
  *H04W 24/02* (2009.01)
(52) U.S. Cl.
  CPC ........... *H04W 72/06* (2013.01); *H04W 74/006* (2013.01); *H04W 76/00* (2013.01); *H04W 24/02* (2013.01); *H04W 28/08* (2013.01)

(56) References Cited

OTHER PUBLICATIONS

Kruys et al., "Spectrum Sharing in the 5 GHz Band DFS Best Practices," Oct. 10, 2007, pp. 1-23, The Wi-Fi Alliance, Spectrum & Regulatory Committee, Spectrum Sharing Task Group, Regulatory Task Group.

ISA/EPO, International Search Report and Written Opinion of the International Searching Authority, Int'l App. No. PCT/US2014/057515, Jan. 19, 2015, European Patent Office, Rijswijk, NL, 9 pgs.

* cited by examiner

TECHNIQUES FOR ASSESSING CLEAR CHANNEL IN AN UNLICENSED RADIO FREQUENCY SPECTRUM BAND

CROSS REFERENCES

The present application for patent claims priority to U.S. Provisional Patent Application No. 61/887,318 by Damnjanovic et al., entitled "Techniques for Assessing Clear Channel In an Unlicensed Radio Frequency Spectrum Band," filed Oct. 4, 2013, assigned to the assignee hereof, and which is hereby incorporated by reference in its entirety.

FIELD OF THE DISCLOSURE

The present disclosure, for example, relates to wireless communication, and more specifically to techniques for assessing clear channel in an unlicensed radio frequency spectrum band.

DESCRIPTION OF RELATED ART

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as Wi-Fi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more heavily utilized, operators are seeking ways to increase capacity. One approach may include the use of WLANs to offload some of the traffic and/or signaling of a cellular network. WLANs (such as Wi-Fi networks) may offer attractive features because, unlike cellular networks that operate in a licensed radio frequency spectrum band, Wi-Fi networks generally operate in an unlicensed radio frequency spectrum band, and are thus available for use by various entities subject to established rules for providing fair access to the spectrum. In many geographic areas, unlicensed radio frequency spectrum band is allocated for primary use by users other than WLAN users. For example, in the US and in Europe, unlicensed radio frequency spectrum band is available which has a primary use as a spectrum for radar signals. Established rules for this spectrum require a device that desires to transmit on the spectrum yield to a radar transmitter when a radar signal is detected. In some deployments, various operators may wish to access the unlicensed radio frequency spectrum band using one or more of various different techniques. However, access to unlicensed radio frequency spectrum band may need coordination to ensure that access points of the same or different operator deployments, using the same or different techniques for accessing the unlicensed radio frequency spectrum band, can co-exist and make effective use of the unlicensed radio frequency spectrum band, while also complying with established rules for spectrum access.

SUMMARY

The present disclosure relates, for example, to one or more improved systems, methods, and/or devices for wireless communications, and more particularly, to multiple clear channel assessment (CCA) procedures for access to a radio frequency spectrum band. According to some aspects, a first CCA procedure may be performed to determine availability of the radio frequency spectrum band and to contend for use of the radio frequency spectrum band among a number of coordinated operators transmitting on the radio frequency spectrum band. A successful first CCA procedure may result in winning the contention for the radio frequency spectrum band for a transmission period that is coordinated among the number of coordinated operators. Upon the successful first CCA procedure, one or more second CCA procedures may be performed during one or more discontinuous transmission (DTX) periods in the transmission period to determine continued availability of the radio frequency spectrum band. The timing of the one or more DTX periods may be determined based on timing of radio transmissions having priority use of the radio frequency spectrum band, such as a radar signal.

According to a first set of illustrative examples, a method of wireless communication may include performing a first clear channel assessment (CCA) procedure to contend for a radio frequency spectrum band for a transmission period, the first CCA procedure performed before the transmission period during a contention period coordinated among a number of operators, determining whether contention is won for the radio frequency spectrum band for the transmission period based on the first CCA procedure, and performing a second CCA procedure, upon a successful completion of the first CCA procedure, to determine availability of the radio frequency spectrum band, the second CCA procedure performed during a discontinuous transmission (DTX) period in the transmission period.

In certain examples, the method may also include transmitting over the radio frequency spectrum band during a portion of the transmission period following the DTX period based on the performance of the second CCA procedure. The number of operators, in some examples, may be assigned a priority index to contend for the radio frequency spectrum at predetermined times during the contention period. In some examples, only a winning operator may contend for the radio frequency spectrum band during the DTX period.

In certain examples, the first CCA procedure determines whether one or more of the operators, radar signals, or one or more other users are transmitting signals that would prohibit use of the radio frequency spectrum band. The second CCA procedure may include, for example, determining whether a radar signal is present that would prohibit use of the radio frequency spectrum band, determining whether another user won the radio frequency spectrum band during the DTX period, and/or performing CCA procedures during each of a number of DTX periods in the transmission period.

In examples having multiple DTX periods, such DTX periods may occur at a periodicity in the transmission period. The periodicity may be based at least in part on, for example, one or more characteristics of signals using the radio frequency spectrum band. In some examples, the periodicity may be based on a signal type of a geographic region, and may include a 0.5 millisecond DTX period for every 2 milliseconds during the transmission period that may be based on, for example, a Federal Communications Commission (FCC) radar type 2, 3, or 4 radar transmission. Additionally or alternatively, the periodicity may be based on a signal type of a geographic region and may include a 2.0 millisecond DTX period for every 7.5 milliseconds during the transmission period that may be based on, for example, a FCC radar type 1 or 5 radar transmission. Additionally or alternatively, the periodicity may be based on a signal type of a geographic region and may include a 5.0 millisecond DTX period for every 13.5 milliseconds during two consecutive transmission periods that may be based on, for example, a European Telecommunications Standards Institute (ETSI) radar type 1, 2, or 5 radar transmission.

In certain examples, the method may include transmitting a channel usage beacon signal (CUBS) over the radio frequency spectrum band when winning the contention for the radio frequency spectrum band prior to transmitting a first data subframe. In some examples, one or more of rank indicator (RI) or channel state information (CSI) measurements may be performed during the first data subframe. In further examples, one or more of reference signal received power (RSRP) or reference signal received quality (RSRQ) measurements may be performed during the first data subframe.

In certain examples, performing the second CCA procedure may include performing CCA procedures during each of a number of DTX periods in the transmission period, and one or more of the DTX periods may include multiple consecutive subframes in the transmission period. In some examples, one or more uplink transmissions may be received during one or more of the DTX periods. A duration of the DTX period, in some examples, may be adaptively determined responsive to a system load for a wireless communications network. A duration of the DTX period may be indicated in a resource grant, according to some examples. The number of operators may, for example, operate a set of coordinated nodes operating according to a protocol used in the radio frequency spectrum band.

According to another set of illustrative examples, an apparatus for wireless communications may include at least one processor and a memory communicatively coupled with the at least one processor. The at least one processor may be configured to execute code stored on the memory to perform a CCA procedure to: contend for a radio frequency spectrum band for a transmission period, the first CCA procedure performed before the transmission period during a contention period coordinated among a number of operators; determine whether contention is won for the radio frequency spectrum band for the transmission period based on the first CCA procedure; and perform a second CCA procedure, upon a successful completion of the first CCA procedure, to determine availability of the radio frequency spectrum band, the second CCA procedure performed during a DTX period in the transmission period.

In certain examples, the at least one processor may be configured to execute code stored on the memory to implement one or more aspects of first set of illustrative examples described above.

According to another set of illustrative examples, an apparatus for wireless communications may include means for performing a first CCA procedure to contend for a radio frequency spectrum band for a transmission period, the first CCA procedure performed before the transmission period during a contention period coordinated among a number of operators; means for determining the contention is won for the radio frequency spectrum band for the transmission period based on the first CCA procedure; and means for performing a second CCA procedure, upon a successful completion of the first CCA procedure, to determine availability of the radio frequency spectrum band, the second CCA procedure performed during a DTX period in the transmission period.

In certain examples, the apparatus may include means for implementing one or more aspects of first set of illustrative examples described above.

According to another set of illustrative examples, a computer program product may include a non-transitory computer-readable medium having computer-readable code. The computer readable code may be configured to cause at least one processor to: perform a first CCA procedure to contend for a radio frequency spectrum band for a transmission period, the first CCA procedure performed before the transmission period during a contention period coordinated among a number of operators; determine whether contention is won for the radio frequency spectrum band for the transmission period based on the first CCA procedure; and perform a second CCA procedure, upon a successful completion of the first CCA procedure, to determine availability of the radio frequency spectrum band, the second CCA procedure performed during a DTX period in the transmission period.

In certain examples, the computer-readable code may be configured to cause the at least one processor to implement one or more aspects of first set of illustrative examples described above.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
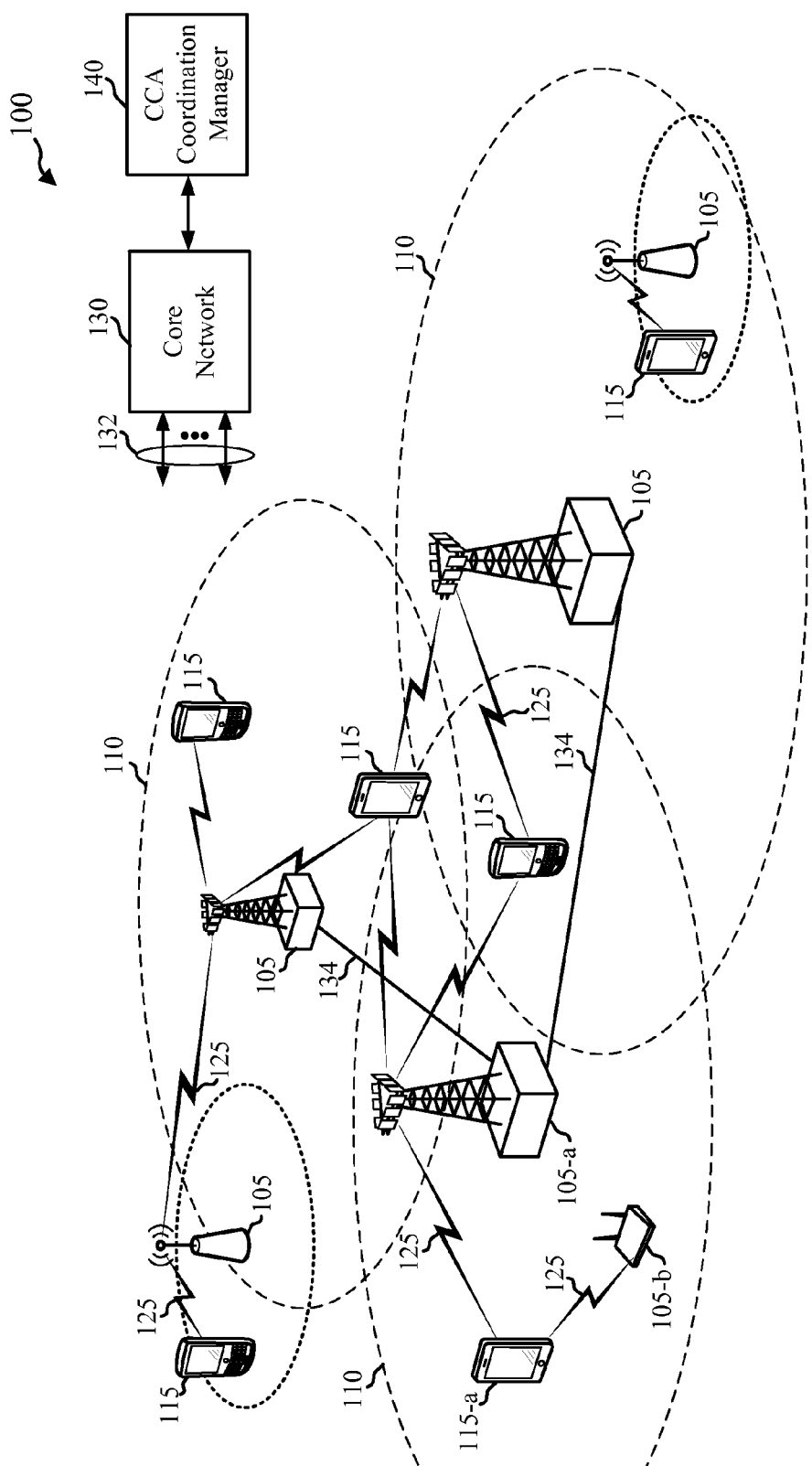
FIG. 1 shows a block diagram conceptually illustrating an example of a wireless communications system, in accordance with aspects of the present disclosure.

Methods, apparatuses, systems, and devices are described in which an unlicensed radio frequency spectrum band may be used for cellular communications (e.g., Long Term Evolution (LTE) communications).

With increasing data traffic in cellular networks, offloading at least some data traffic to unlicensed radio frequency spectrum band may provide cellular operators with opportunities for enhanced data transmission capacity. Prior to gaining channel access and transmitting using an unlicensed radio frequency spectrum band, a transmitting device may, in some deployments perform listen before talk (LBT) procedure to gain channel access. Such a LBT procedure may include a clear channel assessment (CCA) to determine if a particular channel is available. If it is determined that a channel is not available, a CCA may be performed again at a later time. Furthermore, use of unlicensed radio frequency spectrum band may need coordination to ensure that access points of the same or different operator deployments, using the same or different techniques for accessing the unlicensed radio frequency spectrum band, may co-exist within the unlicensed radio frequency spectrum band.

In some cases, the co-existence may be facilitated by the coordination of CCAs performed by different devices or nodes of different operator deployments that want to access the unlicensed radio frequency spectrum band. In some of the CCA coordination methods, CCAs may be coordinated to occur in predetermined time periods amongst multiple devices or nodes that may desire to access the unlicensed radio frequency spectrum band. For example, a time period may be identified during which multiple coordinated base stations may perform a CCA for downlink channel access in an unlicensed radio frequency spectrum band. Such coordination results in a synchronous system in which nodes or devices seek access, and transmit radio frequency signals, in a synchronized manner.

LBT procedures, as noted above, are required in many deployments in order to comply with rules and regulations related to the use of unlicensed radio frequency spectrum band. In many geographic areas, unlicensed radio frequency spectrum band is allocated for primary use by systems other than WLAN users, such as a primary use for radar signals. For example, many 5 GHz frequency bands were initially allocated to radar systems, and were later opened up for unlicensed use provided the transmitters operated according to a Dynamic Frequency Selection (DFS) mechanism to avoid interference with the radar systems. Many Wi-Fi deployments use asynchronous access techniques, which provide sufficient opportunities for detection of such radar signals. However, in systems having synchronized access techniques, additional measures may be required to monitor for such radar signals, which may be transmitted with a timing characteristics that may place the signals outside of a CCA interval for a synchronized system.

According to various aspects of the present disclosure, multiple CCA procedures may be performed for access to a radio frequency spectrum band. According to some aspects, a first CCA procedure may be performed to determine availability of the radio frequency spectrum band and to contend for use of the radio frequency spectrum band among a number of coordinated operators transmitting on the radio frequency spectrum band. A successful first CCA procedure may result in winning the contention for the radio frequency spectrum band for a transmission period that is coordinated among the number of coordinated operators. Upon the successful first CCA procedure, one or more second CCA procedures may be performed during one or more discontinuous transmission (DTX) periods in the transmission period to determine continued availability of the radio frequency spectrum band. The timing of the one or more DTX periods may be determined based on timing of radio transmissions having priority use of the radio frequency spectrum band.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

As used in the present description and the appended claims, the term "wireless wide area network" or "WWAN" refers to a cellular wireless network. Examples of WWANs include, for example, LTE networks, UMTS networks, CDMA2000 networks, GSM/EDGE networks, 1×/EV-DO networks, and the like. In certain examples, a WWAN may be referred to as a "radio access network."

As used in the present description and the appended claims, the term "wireless local area network" or "WLAN" refers to a non-cellular wireless network. Examples of WLANs include, for example, wireless networks conforming to the IEEE 802.11 ("Wi-Fi") family of standards that may transmit using an unlicensed radio frequency spectrum band in the 5 GHz band according to established DFS rules.

FIG. 1 shows a block diagram conceptually illustrating an example of a wireless communications system 100, in accordance with aspects of the present disclosure. The wireless communications system 100 includes a plurality of base stations (e.g., access points, eNBs, or WLAN access points) 105, a number of user equipments (UEs) 115, and a core network 130. Some of the base stations 105 may communicate with the UEs 115 under the control of a base station controller (not shown), which may be part of the core network 130 or the certain base stations 105 (e.g., access points or eNBs) in various examples. Base stations 105 may communicate control information and/or user data with the core network 130 through backhaul links 132. In some examples, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 sites may provide communication coverage for a respective coverage area 110. In some examples, base stations 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some examples, the wireless communications system 100 is an LTE/LTE-A communications system (or network) that supports one or more modes of operation or deployment scenarios, and may employ coordinated contention-based channel access procedures among base stations 105 and UEs 115, and may employ DTX periods for determination of continued channel availability between coordinated contention-based access procedures. Such coordination may be managed by CCA coordination manager 140, according to some examples. In some examples, the wireless communications system 100 may support wireless communications using an unlicensed radio frequency spectrum band and an access technology, or a licensed radio frequency spectrum band and an access technology different from LTE/LTE-A. In LTE/LTE-A network communication systems, the terms evolved Node B (eNodeB) may be generally used to describe the base stations 105. The wireless communications system 100 may be a Heterogeneous LTE/LTE-A network in which different types of base stations provide coverage for various geographical regions. For example, each base station 105 may provide communication coverage for a macro cell, a pico cell, a femto cell, and/or other types of cell. Small cells such as pico cells, femto cells, and/or other types of cells may include low power nodes or LPNs. A macro cell, for example, covers a relatively large geographic area (e.g., several kilometers in radius) and may allow unrestricted access by UEs 115 with service subscriptions with the network provider. A pico cell would, for example, cover a relatively smaller geographic area and may allow unrestricted access by UEs 115 with service subscriptions with the network provider. A femto cell would also, for example, cover a relatively small geographic area (e.g., a home) and, in addition to unrestricted access, may also provide restricted access by UEs 115 having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs or other base stations 105 via a backhaul 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. The downlink transmissions may be made using a licensed radio frequency spectrum band, an unlicensed radio frequency spectrum band, or both. Similarly, the uplink transmissions may be made using a licensed radio frequency spectrum band, an unlicensed radio frequency spectrum band, or both.

In some examples of the wireless communications system 100, various deployment scenarios may be supported including a supplemental downlink mode in which LTE downlink capacity in a licensed radio frequency spectrum band may be offloaded to an unlicensed radio frequency spectrum band, a carrier aggregation mode in which both LTE downlink and uplink capacity may be offloaded from a licensed radio frequency spectrum band to an unlicensed radio frequency spectrum band, and a standalone mode in which LTE downlink and uplink communications between a base station (e.g., eNB) and a UE may take place in an unlicensed radio frequency spectrum band. Each of the different modes may operate according to frequency division duplexing (FDD) or time division duplexing (TDD). OFDMA communications signals may be used in the communications links 125 for LTE downlink transmissions in an unlicensed and/or a licensed radio frequency spectrum band, while SC-FDMA communications signals may be used in the communications links 125 for LTE uplink transmissions in an unlicensed and/or a licensed radio frequency spectrum band. Transmissions using the unlicensed radio frequency spectrum band may be carried using one or more carrier frequencies in a frequency band. A frequency band, for example, may be divided into multiple carrier frequencies, and each carrier frequency may have the same bandwidth or different bandwidth. For example, each carrier frequency may occupy 20 MHz of a 5 GHz frequency band.

In many deployments, as mentioned above, a device seeking to transmit using an unlicensed radio frequency spectrum band may be required to verify that the unlicensed radio frequency spectrum band is available for use in such a transmission, that is, the unlicensed radio frequency spectrum band is not already in use by one or more other devices. Thus, prior to transmitting using the unlicensed radio frequency spectrum band, a device may perform a contention-based channel access procedure, also referred to as a listen before talk (LBT) procedure, in order to gain channel access. For example, a CCA may be used to determine availability of the unlicensed radio frequency spectrum band. Performance of a CCA may involve checking that the desired spectrum is not otherwise occupied prior to initiating transmissions. In some examples, CCA opportunities are coordinated across multiple base stations 105, and may occur at periodic intervals, such as every 10 milliseconds (ms). A transmitting entity, such as a base station 105, may desire channel access and perform a CCA to determine if a particular carrier frequency in the unlicensed radio frequency spectrum band is occupied. If the particular carrier frequency in the unlicensed radio frequency spectrum band is occupied, the base station 105 waits until the next CCA opportunity before attempting to obtain channel access again on the associated carrier frequency. In deployments that provide CCA opportunities once every 10 ms, the base station 105 would then have to wait 10 ms before attempting channel access. Similarly, a UE 115 may desire to transmit uplink data using an unlicensed radio frequency spectrum band to a base station 105, and perform a CCA in a similar manner.

In some examples, as mentioned above, multiple operators may provide coordinated base stations 105 that may perform a first CCA procedure at predefined times in a contention-based procedure for access to a radio frequency spectrum band. A base station 105 that does not win a radio frequency spectrum band channel during the first CCA procedure then waits a predefined time period for the next coordinated CCA opportunity. A base station 105 that does win the radio frequency spectrum band channel may then transmit radio signals using the radio frequency spectrum band. As noted above, in certain geographic areas, the radio frequency spectrum band may be allocated to radar systems as priority users of the radio frequency spectrum band. According to some examples, a base station 105 that wins the radio frequency spectrum band in a first CCA procedure may perform one or more second CCA procedures during one or more DTX periods to determine that the radio frequency spectrum band is available for use (e.g., that a radar has not started transmitting since the previous first CCA procedure) during a transmission period. If the radio frequency spectrum band is not available for use, the base station 105 may not transmit, and perform another second CCA procedure in a subsequent DTX period of the transmission period. If the radio frequency spectrum band is available, the base station 105 may resume transmissions during the transmission period. In some examples, multiple DTX periods may occur between first CCA procedures.

Figure 2:
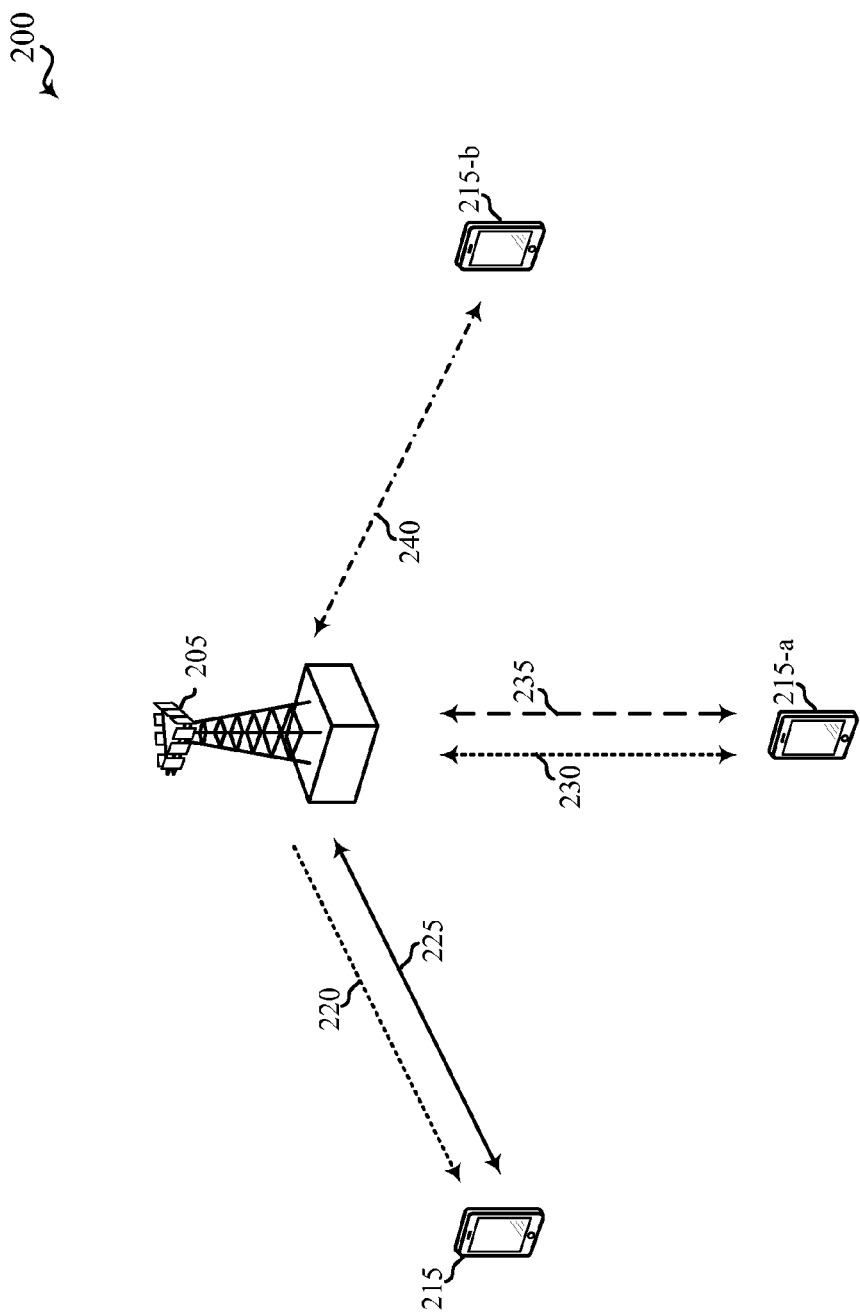
FIG. 2 is a block diagram conceptually illustrating examples of deployment scenarios for using LTE deployed in an unlicensed radio frequency spectrum band in, accordance with aspects of the present disclosure.

FIG. 2 is a block diagram conceptually illustrating examples of deployment scenarios for using LTE deployed in an unlicensed radio frequency spectrum band, in accordance with aspects of the present disclosure. A wireless communications system 200 illustrates examples of a supplemental downlink mode, a carrier aggregation mode, and a standalone mode, for between an eNB 205 and UEs 215 in an LTE network that deploys unlicensed radio frequency spectrum band. The wireless communications system 200 may be an example of portions of the wireless communications system 100 described with reference to FIG. 1. Moreover, the eNB 205 may be an example of one of the base stations 105 of FIG. 1, while the UEs 215 may be examples of the UEs 115 described with reference to FIG. 1.

In the example of a supplemental downlink (SDL) mode in wireless communications system 200, the eNB 205 may transmit OFDMA communications signals to a UE 215 using downlink 220. In the example of FIG. 2, downlink 220 may be associated with a frequency in an unlicensed radio frequency spectrum band. The eNB 205 may transmit OFDMA communications signals to the same UE 215 using a bidirectional link 225 and may receive SC-FDMA communications signals from that UE 215 using the bidirectional link 225. The bidirectional link 225 may be associated with a frequency in a licensed radio frequency spectrum band. The downlink 220 in the unlicensed radio frequency spectrum band and the bidirectional link 225 in the licensed radio frequency spectrum band may operate concurrently. The downlink 220 may provide a downlink capacity offload for the eNB 205. In some examples, the downlink 220 may be used for unicast services (e.g., addressed to one UE) or for multicast services (e.g., addressed to several UEs). This scenario may occur with any service provider (e.g., a traditional mobile network operator or MNO) that uses a licensed radio frequency spectrum band and needs to relieve some of the traffic and/or signaling congestion.

In one example of a carrier aggregation (CA) mode in wireless communications system 200, the eNB 205 may transmit OFDMA communications signals to a UE 215-a using a bidirectional link 230 and may receive SC-FDMA communications signals from the same UE 215-a using the bidirectional link 230. In the example of FIG. 2, bidirectional link 230 that may be associated with a frequency in an unlicensed radio frequency spectrum band. The eNB 205 may also transmit OFDMA communications signals to the same UE 215-a using a bidirectional link 235 and may receive SC-FDMA communications signals from the same UE 215-a using the bidirectional link 235. The bidirectional link 235 may be associated with a frequency in a licensed radio frequency spectrum band. The bidirectional link 230 may provide a downlink and uplink capacity offload for the eNB 205. Like the supplemental downlink described above, this scenario may occur with any service provider (e.g., an MNO) that uses a licensed radio frequency spectrum band and needs to relieve some of the traffic and/or signaling congestion. Bidirectional link 230 may operate using TDD communications, according to some examples. As both the eNB 205 and UE 215-a transmit data using bidirectional link 230, each would perform an LBT procedure prior to transmitting data using the bidirectional link 230 on the unlicensed radio frequency spectrum band, and each may perform both first and second CCA procedures for access to the radio frequency spectrum band channel.

In an example of a standalone (SA) mode in wireless communications system 200, the eNB 205 may transmit OFDMA communications signals to a UE 215-b using a bidirectional link 240 and may receive SC-FDMA communications signals from the same UE 215-b using the bidirectional link 240 which may be associated with a frequency in an unlicensed radio frequency spectrum band. Bidirectional link 240 may operate using TDD communications, according to some examples. The bidirectional link 240 may provide a downlink and uplink capacity offload for the eNB 205. This example and those provided above are presented for illustrative purposes and there may be other similar modes of operation or deployment scenarios for capacity offload.

As described above, a service provider that may benefit from the capacity offload offered by using an unlicensed radio frequency spectrum band may be a traditional MNO with a licensed radio frequency spectrum band. For these service providers, an operational configuration may include a bootstrapped mode (e.g., supplemental downlink, carrier aggregation) that uses a primary component carrier (PCC) on the licensed radio frequency spectrum band and a secondary component carrier (SCC) on the unlicensed radio frequency spectrum band.

In the SDL mode, control may be transported over the LTE uplink (e.g., uplink portion of the bidirectional link 225) in the licensed radio frequency spectrum band. One of the reasons to provide downlink capacity offload is because data demand is largely driven by downlink consumption. Moreover, in this mode, there may be reduced regulatory impact since the UE 215 is not transmitting in the unlicensed radio frequency spectrum band.

In the CA mode, data and control may be communicated in LTE (e.g., bidirectional link 235) using a licensed radio frequency spectrum band while data may be communicated using bidirectional link 230 using an unlicensed radio frequency spectrum band. The carrier aggregation mechanisms supported when using the unlicensed radio frequency spectrum band may fall under a hybrid frequency division duplexing-time division duplexing (FDD-TDD) carrier aggregation or a TDD-TDD carrier aggregation with different symmetry across component carriers.

In any of the various operation modes, communications may be transmitted on one or multiple carrier frequencies in the unlicensed radio frequency spectrum band. According to various examples, as mentioned above, communications may be transmitted according to TDD techniques. As is understood, a number of subframes in TDD communications may include downlink data, and a number of subframes may include uplink data.

Figure 3:
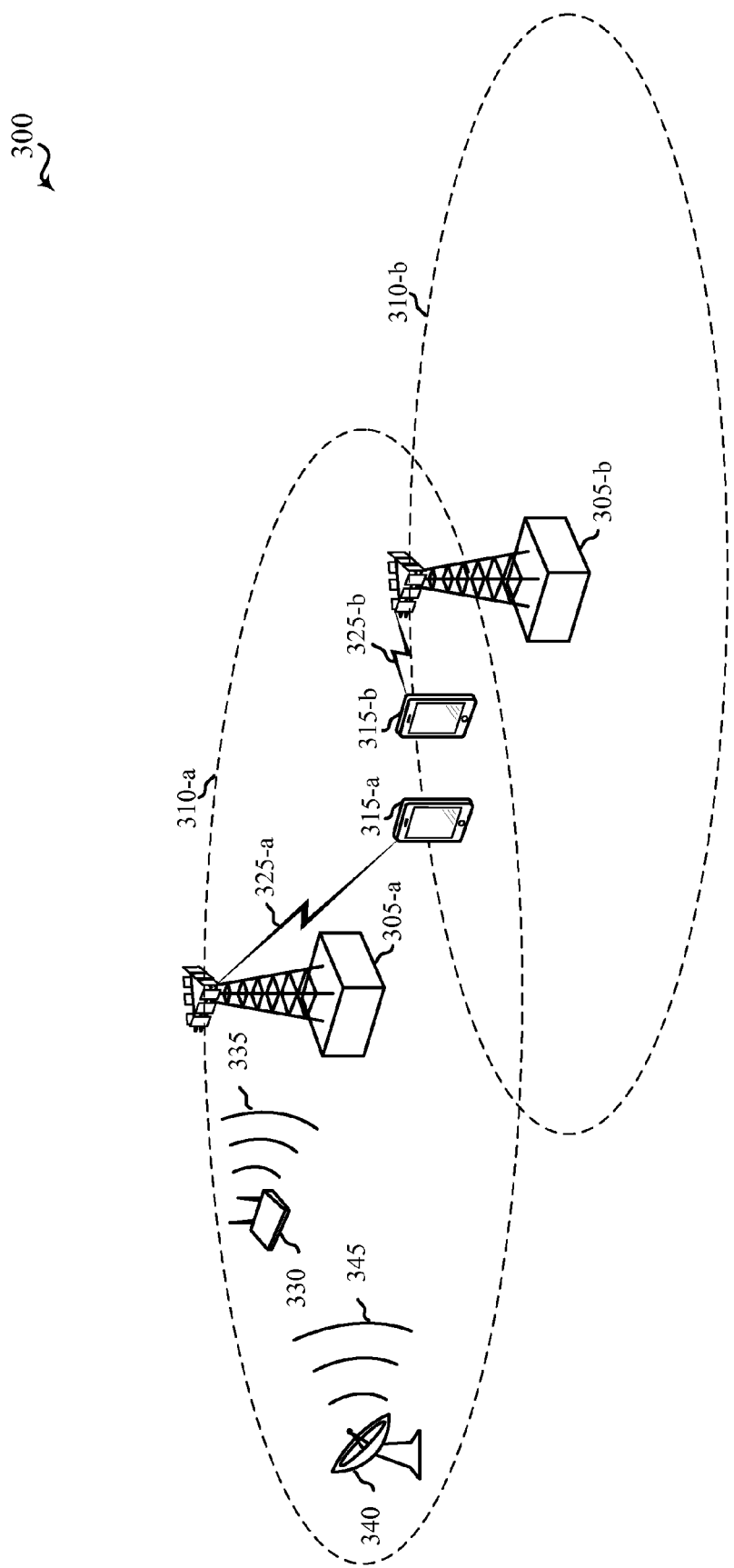
FIG. 3 is a block diagram conceptually illustrating an example of neighboring base stations, associated UEs, and other spectrum users, in accordance with aspects of the present disclosure.

FIG. 3 is a block diagram conceptually illustrating an example of neighboring base stations, associated UEs, and other spectrum users, in accordance with aspects of the present disclosure. In this example, a portion of a wireless communications system 300 is illustrated in which multiple eNBs 305-a and 305-b may have overlapping coverage areas 310-a and 310-b, respectively. In this example, eNB 305-a may communicate with UE 315-a using communications link 325-a in an unlicensed radio frequency spectrum band. Similarly, eNB 305-b may communicate with UE 315-b using communications link 325-b in an unlicensed radio frequency spectrum band. According to some deployments, eNBs 305 and UEs 315 may be coordinated and contend for the channel independently on each synchronous frame during a contention period that is coordinated among the eNBs 305. In the example of FIG. 3, other users may also transmit signal in the unlicensed radio frequency spectrum band, including, in this example, a Wi-Fi access point 330 and a radar system 340. Wi-Fi access point 330 may transmit Wi-Fi signals 335 in the unlicensed radio frequency spectrum band, and the radar system 340 may transmit radar signals 345 in the unlicensed radio frequency spectrum band.

As mentioned above, Wi-Fi access point 330 may communicate asynchronously with one or more other devices and may not have priority over any other devices seeking access to the radio frequency spectrum band. Accordingly, Wi-Fi access point 330 may gain channel access to the radio frequency spectrum band through standard LBT procedures used to access an unlicensed radio frequency spectrum band. In the event that Wi-Fi access point 330 is transmitting during a CCA procedure of one or both of eNBs 305, the Wi-Fi access point 330 would win the radio frequency spectrum band channel, and eNBs 305 would not transmit using the radio frequency spectrum band channel until a successful CCA procedure.

Radar system 340, however, may have priority use of the radio frequency spectrum band, and eNBs 305 operating according to a synchronous transmission protocol may not detect one or more radar signals 345 from the radar system 340 when only monitoring the radio frequency spectrum band during the coordinated contention intervals. For example, in the United States, the Federal Communications Commission (FCC) specifies a number of different radar test waveforms that are distinguished based on Pulse Repetition Interval (PRI), pulse width, and pulse burst length. The FCC also specifies a minimum percentage of successful detection and a number of trials for the test waveforms.

Table 1 through Table 3 provide current specifications for short pulse radar test waveforms, long pulse radar test waveforms, and frequency hopping radar test waveforms, respectively.

TABLE 1

FCC Short Pulse Radar Test Waveforms

| Radar type | Pulse Width (μs) | PRI | Pulses per burst | Minimum % of successful detection | Number of Trials (Times) |
| --- | --- | --- | --- | --- | --- |
| 1 | 1 | 1428 | 18 | 60% | 30 |
| 2 | 1-5 | 150-230 | 23-29 | 60% | 30 |
| 3 | 6-10 | 200-500 | 16-18 | 60% | 30 |
| 4 | 11-20 | 200-500 | 12-16 | 60% | 30 |
| 1-4 | x | x | x | 80% | 120 |

TABLE 2

FCC Long Pulse Radar Test Waveforms

| Radar type | Pulse Width (μs) | Chirp width (MHz) | PRI | Number of pulses' per burst | Number of Bursts | Minimum % of successful detection | Number of Trials(Times) |
| --- | --- | --- | --- | --- | --- | --- | --- |
| 5 | 50-100 | 5-20 | 1000-2000 | 1-3 | 8-20 | 80% | 30 |

TABLE 3

Frequency Hopping Radar Test Waveforms

| Radar type | Pulse Width (μs) | PRI | Pulses per hop | Hopping rate (MHz) | Hopping sequence Length (msec) | Minimum % of successful detection | Number of Trials(Times) |
| --- | --- | --- | --- | --- | --- | --- | --- |
| 6 | 1 | 333 | 9 | 0.333 | 300 | 70% | 30 |

Thus, in order to reliably detect the radar test signals of the various different radar types, the radio frequency spectrum band channel should be monitored for at least 0.5 milliseconds after 1.5 milliseconds of transmission in order to detect the presence of a radar type 2, 3, or 4. Additionally, the radio frequency spectrum band channel should be monitored for at least 2.0 milliseconds after 7.5 milliseconds of transmission in order to detect the presence of a radar type 1 or 5. According to some examples, as will be described in more detail below, an eNB 305, or UE 315, may perform a CCA procedure in discontinuous transmission (DTX) periods that correspond to the times the radio frequency spectrum band channel should be monitored.

Similarly, in some portions of Europe, the European Telecommunications Standards Institute (ETSI) specifies a number of different radar test waveforms that are distinguished based on Pulse Repetition Interval (PRI), pulse width, and pulses per burst. Table 4 provides current ETSI specifications.

TABLE 4

Parameters of ETSI test signals

| Radar test signal | Pulse Width [μs] | PRI [pps] | Pulses per burst [ppb] |
| --- | --- | --- | --- |
| 1 - Fixed | 1 | 750 | 15 |
| 2 - Variable | 1, 2, 5 | 200, 300, 500, 800, 1000 | 10 |
| 3 - Variable | 10, 15 | 200, 300, 500, 800, 1000 | 15 |
| 4 - Variable | 1, 2, 5, 10, 15 | 1200, 1500, 1600 | 15 |
| 5 - Variable | 1, 2, 5, 10, 15 | 2300, 3000, 3500, 4000 | 25 |
| 6 - Variable modulated | 20, 30 | 2000, 3000, 40000 | 20 |

Thus, in order to reliably detect the radar test signals of radar types 3, 4, and 6, monitoring such as described above with respect to the FCC test signals would also detect these signal types. For ETSI radar signal types 1, 2, or 5, the radio frequency spectrum band channel should be monitored for at least 5.0 milliseconds in each 10 millisecond transmission period frame. In some examples, as will be described in more detail below, two 10 millisecond transmission periods may be bundled and the radio frequency spectrum band channel may be monitored for 5 milliseconds for every 13.5 milliseconds of transmission during the two consecutive transmission periods.

Thus, according to some examples, an eNB 305 or UE 315 that wins the radio frequency spectrum band in a first CCA procedure may perform one or more second CCA procedures during one or more DTX periods to determine that the radio frequency spectrum band is available for use, that is, that radar system 340 has not started transmitting since the previous first CCA procedure. If the radio frequency spectrum band is not available for use, the eNB 305 that won the contention may not transmit, and perform another CCA procedure in a subsequent DTX period. If the radio frequency spectrum band is available according to the CCA procedure in the subsequent DTX period, the eNB 305 may resume transmissions. The eNB 305 that lost the contention would not perform a CCA again until the next coordinated contention period, and therefore would not perform a CCA during one or more of the DTX periods. Various examples for DTX periods and CCA procedures will be described in more detail below.

Figure 4:
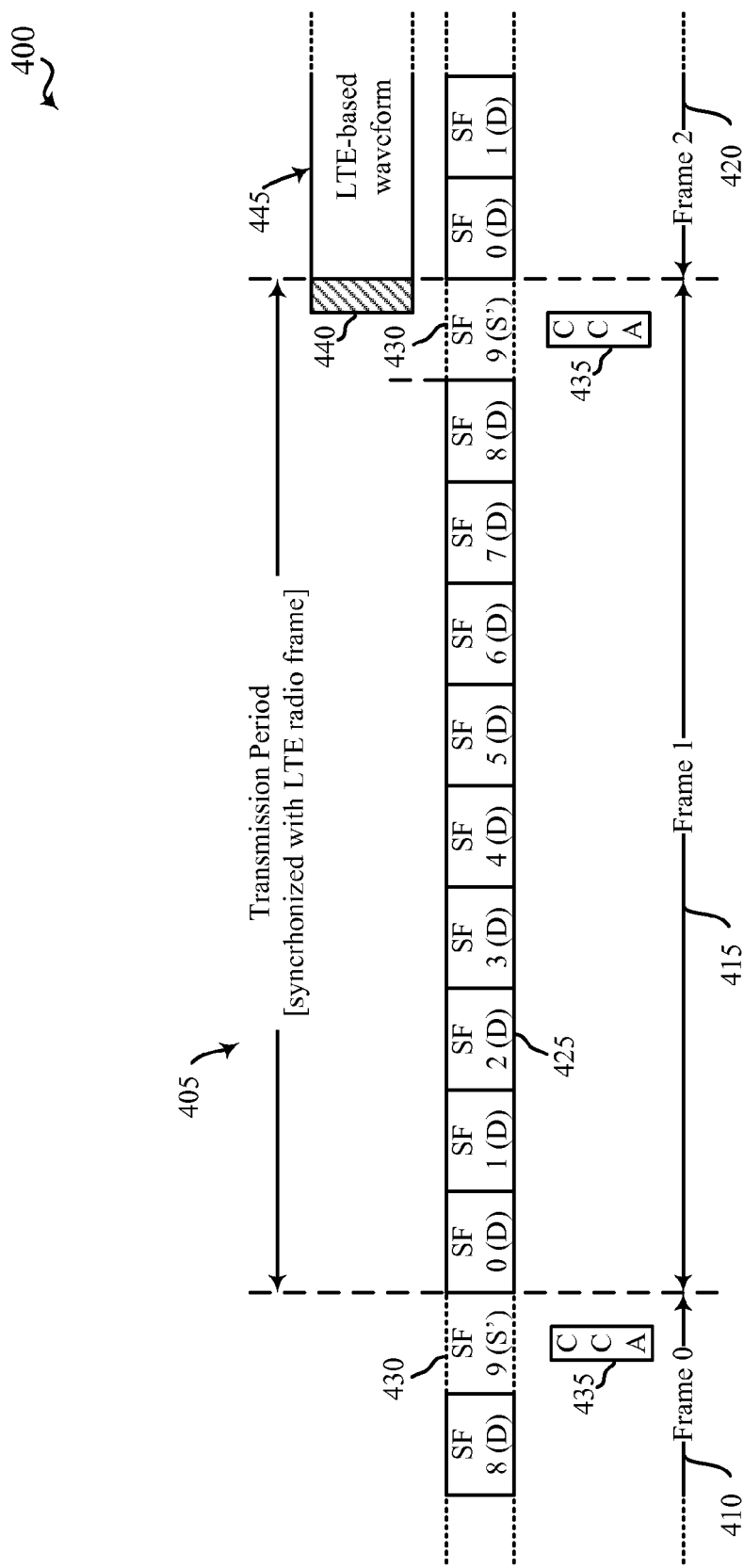
FIG. 4 is a block diagram conceptually illustrating an example of a radio frame and associated subframes, and downlink CCA intervals for coordinated contention-based radio frequency spectrum band access, in accordance with aspects of the present disclosure.

As mentioned above, according to some deployments multiple operators may coordinate access point transmissions using unlicensed radio frequency spectrum band. FIG. 4 is a block diagram conceptually illustrating an example of a radio frame and associated subframes, and downlink CCA intervals for coordinated contention-based radio frequency spectrum band access, in accordance with aspects of the present disclosure. In the example 400 of FIG. 4, radio frames have a transmission period 405 that is synchronized with an LTE radio frame. In some examples, the transmission period 405 is 10 milliseconds. In this example, supplemental downlink frames 410, 415, and 420 are illustrated, having nine downlink subframes 425 and one special (S') subframe 430. The S' subframe 430 serves to provide a minimum off time as required by various regulations related to unlicensed radio frequency spectrum band, and is also the subframe in which a downlink CCA (DCCA) may be performed by a base station, access point, or eNB, such as access points, base stations, or eNBs 105, 205, and/or 305 described above with respect to FIGS. 1, 2, and/or 3. UEs, such as UEs 115, 215, and/or 315 described above with respect to FIGS. 1, 2, and/or 3, may perform a similar CCA procedure prior to transmitting in such a system.

In other examples, such as carrier aggregation and/or standalone mode operating according to TDD, one or more subframes may be uplink subframes, special subframe 430 may serve as a transition between downlink subframes 425 and uplink subframes, with another special subframe used to serve as a transition between uplink and downlink subframes 425. Following a successful CCA, an eNB may transmit a channel usage beacon signal (CUBS) 440 to provide an indication that the eNB has won the channel, followed by transmission of an LTE-based waveform 445 that may include a number of subframes.

As discussed above, according to some examples, following a successful CCA, an eNB (or UE) may perform a CCA during DTX periods to determine that the radio frequency spectrum band is available for transmissions. Such DTX periods and associated CCAs may allow for detection of radar signals, such as described above, which have priority on the radio frequency spectrum band, and do not perform the same contention-based LBT procedures of other devices that use the radio frequency spectrum band. The DTX periods and associated CCAs may also determine that another device has started using the radio frequency spectrum band during the DTX period, such as a Wi-Fi access point, for example, that operates according to a contention-based LBT procedure for accessing the radio frequency spectrum band. While other devices may obtain channel access during these DTX periods, other access points in the coordinated set of access points will not contend for radio frequency spectrum band channel access during these DTX periods.

Figure 5:
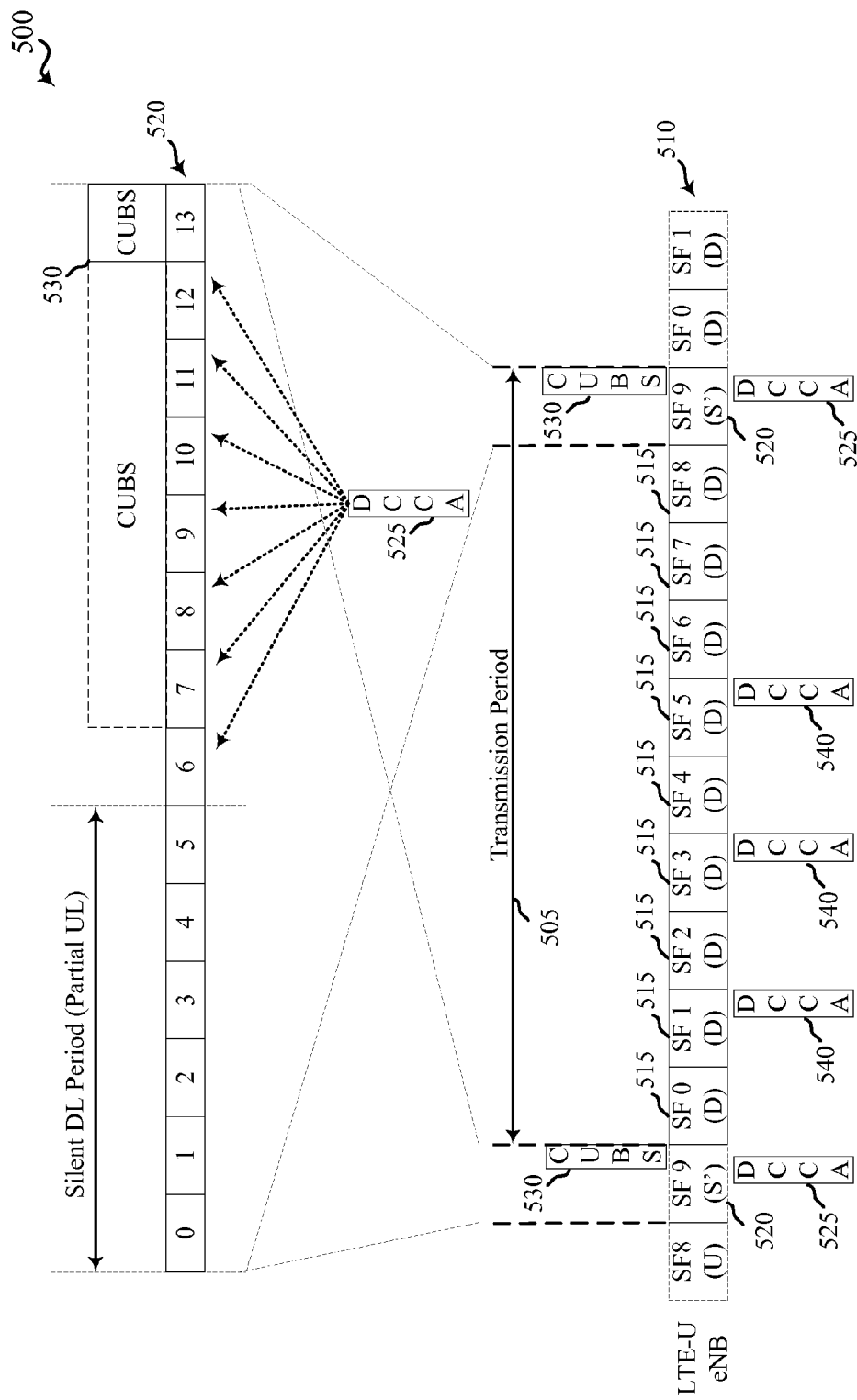
FIG. 5 is a block diagram conceptually illustrating an example of a radio frame and associated subframes, and downlink CCA intervals for contention-based and non-contention based radio frequency spectrum band access, in accordance with aspects of the present disclosure.

FIG. 5 is a block diagram conceptually illustrating an example of a radio frame and associated subframes, and downlink CCA intervals for contention-based and non-contention based radio frequency spectrum band access, in accordance with aspects of the present disclosure. In the example 500 of FIG. 5, radio frames have a transmission period 505 that may be synchronized with an LTE radio frame, and may have a 10 millisecond period, for example. In this example, an eNB in LTE communications over an unlicensed radio frequency spectrum band, such as access points, base stations, or eNBs 105, 205, and/or 305 described above with respect to FIGS. 1, 2, and/or 3, may transmit radio frames 510 in a supplemental downlink mode with nine downlink subframes 515 and a special (S') subframe 520. A downlink CCA (DCCA) procedure 525 may be performed immediately prior to the start of a transmission period 505, in which a CUBS 530 is transmitted by the node that wins the contention for the radio frequency spectrum band. Between DCCAs 525, additional DCCAs 540 may be performed in accordance with various examples during DTX periods, as will be described in more detail below.

In the example of FIG. 5, the S' subframe 520 may include 14 OFDM symbols, numbered 0 through 13 in FIG. 5. A first portion of the S' subframe, symbols 0 through 5 in this example, may be used by eNBs as an off time, which may be required for use of the unlicensed radio frequency spectrum band. Thus, an eNB will not transmit data during this period, although a UE may transmit some amount of data during such a period, and thus some uplink data may be transmitted in this period, according to various examples. A second portion of the S' subframe 520 may be used for DCCA 525. In the example of FIG. 5, the S' subframe 520 includes seven DCCA intervals, included in symbols 6 through 12 of the S' subframe 520. In some deployments, different eNBs and different operators may be assigned a priority index to contend for the radio frequency spectrum band during the DCCA 525 procedure. In some examples, in order to determine which of the seven possible intervals is used to perform a DCCA 525, the eNB may evaluate a mapping-function or other signaling provided from a core network or CCA coordination manager, such as described with respect to FIG. 1, for example. An eNB that wins contention in a DCCA procedure 525 may transmit a CUBS 530 that may be received by other devices to indicate that the winning eNB has won the contention for the radio frequency spectrum band for the transmission period 505. The duration of the CUBS transmission depends upon the priority index of the eNB that won contention, and which of OFDM symbols 6-12 is used by the eNB.

Figure 6:
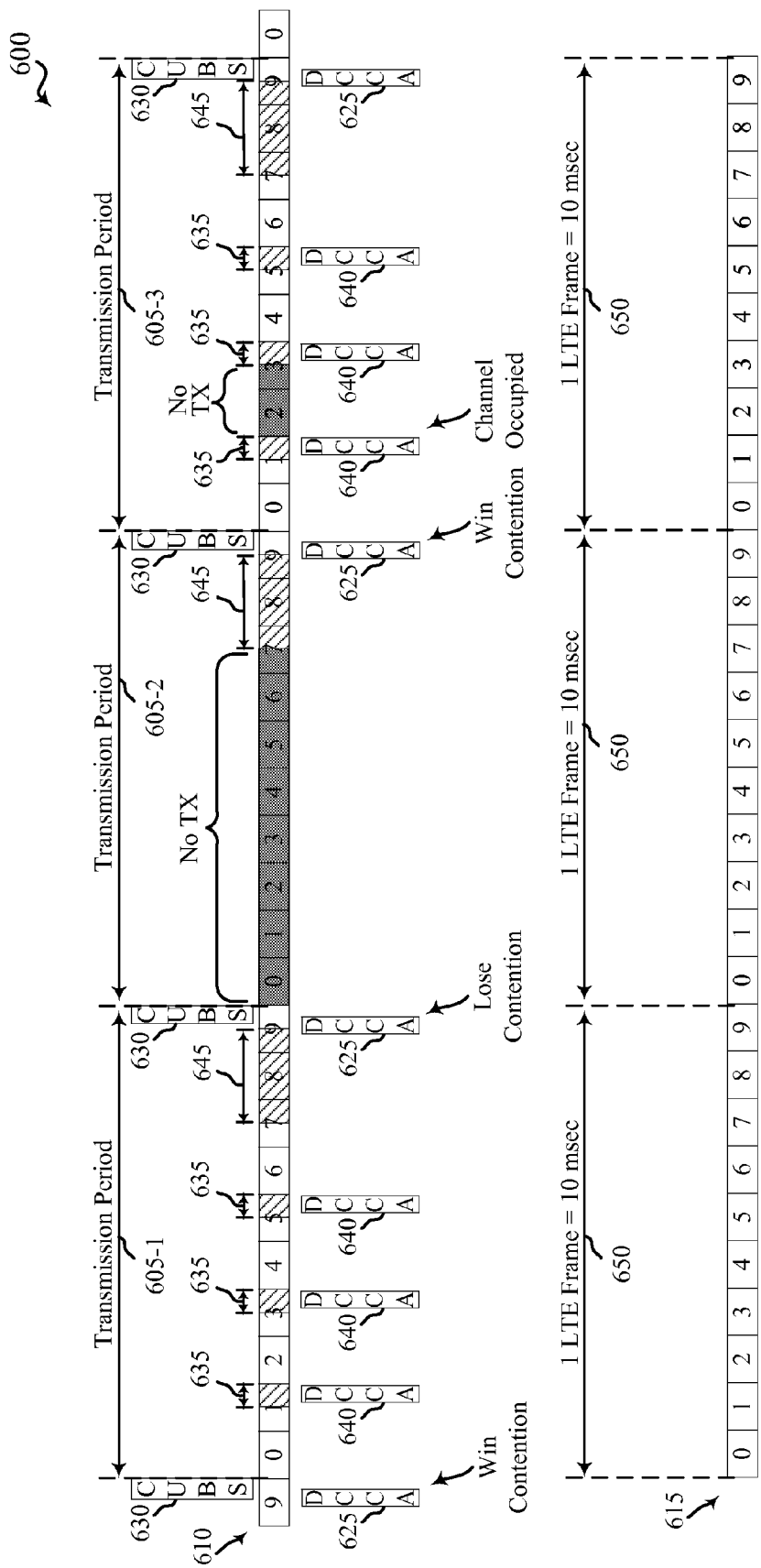
FIG. 6 is a block diagram conceptually illustrating DTX periods and downlink CCA intervals, in accordance with aspects of the present disclosure.

FIG. 6 is a block diagram conceptually illustrating DTX periods and downlink CCA intervals, in accordance with aspects of the present disclosure. In this example 600, three consecutive frames 610 are illustrated that may be observed by eNBs, such as access points, base stations, or eNBs 105, 205, and/or 305 described above with respect to FIGS. 1, 2, and/or 3, that transmit using a radio frequency spectrum band requiring a LBT procedure prior to channel access. Each frame may have a transmission period 605-1, 605-2, and 605-3, respectively, which corresponds to an LTE frame period 650 corresponding to a synchronized LTE transmission 615 of one or more eNBs or other network nodes. Similarly as discussed above, an eNB may conduct a first downlink CCA 625 immediately prior to the start of a transmission period 605-1, to contend for a radio frequency spectrum band for the subsequent transmission period 605-1. The first downlink CCA procedure 625 may determine whether one or more of the plurality of operators, radar signals, or one or more other users are transmitting signals that would prohibit use of the radio frequency spectrum band. The downlink CCA 625 may be performed during a contention period coordinated among a plurality of operators and/or a plurality of eNBs, for example. A CUBS 630 is transmitted when an eNB wins the contention for the radio frequency spectrum band.

In this example, a plurality of DTX periods 635 are observed by the winner of the contention for the radio frequency spectrum band, and upon a successful completion of the first CCA procedure, a second CCA procedure 640 may be performed by the winner of the contention during each DTX period 635 to determine availability of the radio frequency spectrum band. In this example, a final DTX period 645 is observed at the end of transmission period 605 as well. The DTX periods 635 and 645 occur at a periodicity in the transmission period 605 that may be based on one or more characteristics of signals using the radio frequency spectrum band, such as radar signals. For example, the periodicity of DTX periods 635 may comprise a 0.5 millisecond DTX period for every 2 milliseconds during the transmission periods 605, which is based on a FCC radar type 2, 3, or 4 radar transmission. Periodicity of DTX periods 645 may comprise a 2.0 millisecond DTX period for every 7.5 milliseconds during the transmission periods 605, which is based on a FCC radar type 1 or 5 radar transmission. If the downlink CCA procedures 640 indicate the radio frequency spectrum band is available for transmission, the eNB may transmit over the radio frequency spectrum band during a portion of the transmission period following the DTX period 635 or 645 based on the performance of the CCA procedure 640.

In the example of FIG. 6, the eNB may lose the contention for the radio frequency spectrum band in the second transmission period 605-2, in which case the eNB will not transmit using the radio frequency spectrum band during the second transmission period 605-2, nor perform any CCAs until the coordinated CCA interval at the end of the second transmission period 605-2, at which point the eNB may again win contention and begin transmitting, observing DTX periods 635 and 645 for transmission period 605-3. In this example, the eNB may detect that the radio frequency spectrum band channel is occupied following one of the CCAs 640, and will not transmit using the radio frequency spectrum band until a subsequent CCA 640 indicates that the radio frequency spectrum band is again available for transmission.

According to some examples, a duration of the DTX periods 635 and 645 may be adaptively determined responsive to a system load for a wireless communications network. Such an adaptive determination may reduce overhead associated with the DTX periods and associated downlink CCAs 640. For example, at relatively light loads, the DTX periods 635 may be one or two OFDM symbol(s), which may be just enough time to satisfy the LBT requirement. At medium to relatively heavy loads, the DTX periods 635 could be 0.5 milliseconds. For example, an eNB may start with a frame structure having DTX periods with 0.5 millisecond gaps, similarly as described above. If a radar signal is not detected for a configurable amount of time, such as some number of seconds, minutes, hours, or days, the eNB may switch to an adaptive frame structure where frames with 0.5 millisecond DTX periods occur periodically every number of seconds, otherwise the DTX periods are small, such as one or two OFDM symbols, every 2 milliseconds. In such a manner, overhead associated with the DTX periods 635 and 645 may be reduced. In such examples, the DTX period could be indicated in the downlink grant and/or in other resource grant information. In such examples, when performing channel state information measurements (e.g., RRM/RLM measurements), a UE may assume a larger DTX period when reading a downlink grant channel when addressed to the UE, as CSI measurements taken assuming such timing may provide more accurate measurements.

Figure 7:
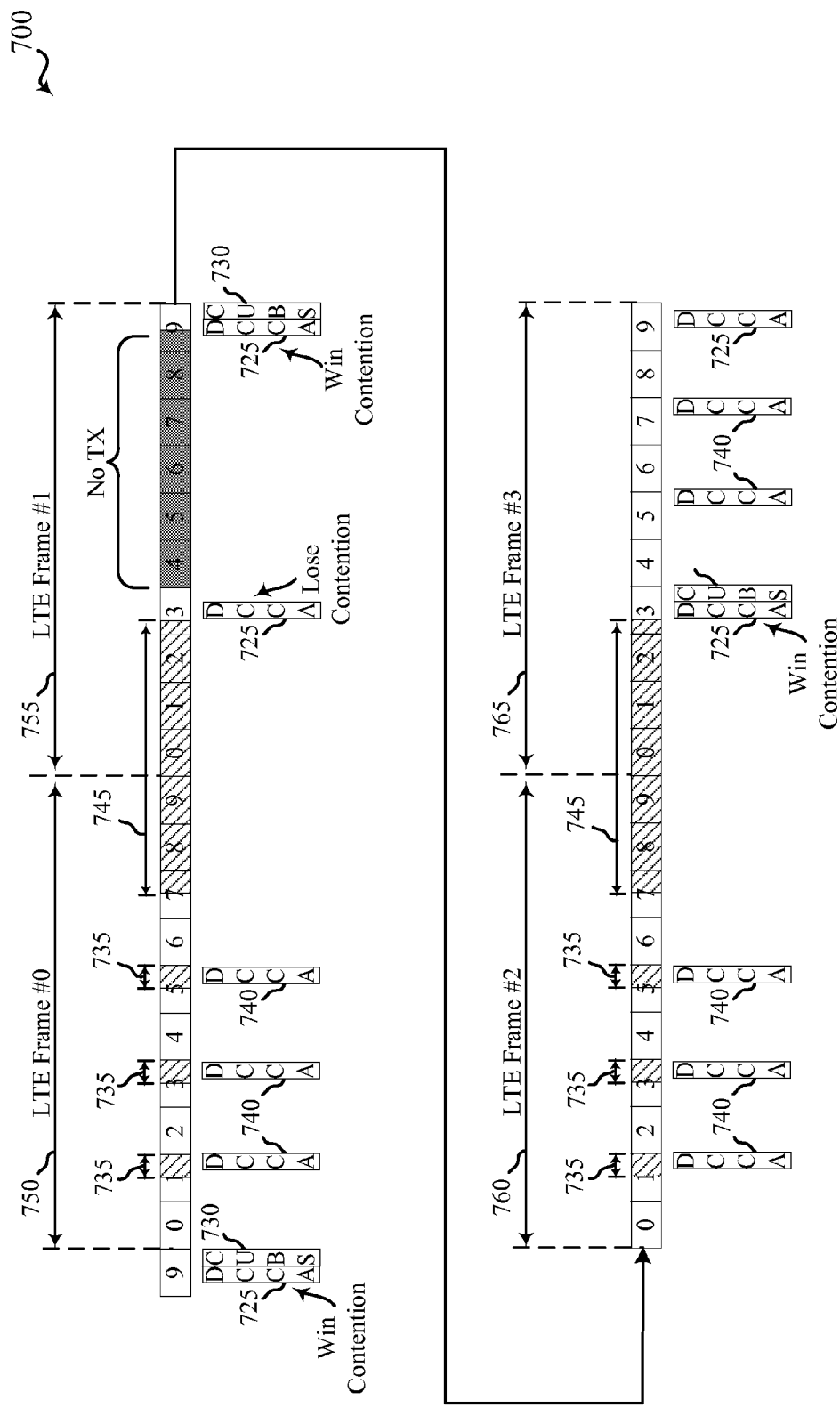
FIG. 7 is a block diagram conceptually illustrating DTX periods and downlink CCA intervals, in accordance with aspects of the present disclosure.

FIG. 7 is a block diagram conceptually illustrating DTX periods and downlink CCA intervals, in accordance with aspects of the present disclosure. In this example 700, four consecutive frames 750-765 are illustrated that may be observed by eNBs, such as access points, base stations or eNBs 105, 205, and/or 305 described above with respect to FIGS. 1, 2, and/or 3, that transmit using a radio frequency spectrum band requiring a LBT procedure prior to channel access. Each frame 750-765 may have a transmission period which may correspond to an LTE frame period of a synchronized LTE transmission of one or more eNBs or other network nodes. Similarly as discussed above, an eNB may conduct a first downlink CCA 725 immediately prior to the start of a transmission period corresponding to frame 750, to contend for a radio frequency spectrum band for the subsequent transmission period. In this example, consecutive contention periods for coordinated nodes may not correspond directly to an LTE frame length, because DTX period 745 in this example spans two consecutive frames 750, 755. The first downlink CCA procedure 725 prior to frame 750 may determine whether one or more of the plurality of operators, radar signals, or one or more other users are transmitting signals that would prohibit use of the radio frequency spectrum band. A subsequent downlink CCA procedure 725 may occur in subframe 3 of frame 755, rather than at the end of frame 750, because DTX period 745 spans into frame 755. The downlink CCAs 725 may be performed during a contention period coordinated among a plurality of operators and/or a plurality of eNBs, for example. A CUBS 730 is transmitted when an eNB wins the contention for the radio frequency spectrum band in downlink CCAs 725. According to some examples, a duration of the DTX periods 735 and 745 may be adaptively determined responsive to a system load for a wireless communications network, similarly as discussed with respect to FIG. 6.

Continuing with the example of FIG. 7, a plurality of DTX periods 735 are observed by the winner of the contention for the radio frequency spectrum band, and upon a successful completion of the first CCA procedure, a second CCA procedure 740 may be performed by the winner of the contention during each DTX period 735 to determine availability of the radio frequency spectrum band. In this example, DTX periods 745 are observed that span two frames, namely frames 750 to 755 and 760 to 765 of this example. The DTX periods 735 and 745 occur at a periodicity that may be based on one or more characteristics of signals using the radio frequency spectrum band, such as radar signals. For example, the periodicity of DTX periods 735 may comprise a 0.5 millisecond DTX period for every 2 milliseconds during the transmission period associated with a frame 750, which is based on a FCC radar type 2, 3, or 4 radar transmission or ETSI radar type 3, 4, or 6 radar transmission. Periodicity of DTX periods 745 may comprise a 5.0 millisecond DTX period for every 13.5 milliseconds during two consecutive frames 750, 755, which is based on an ETSI radar type 1, 2 or 5 radar transmission. If the downlink CCA procedures 740 indicate the radio frequency spectrum band is available for transmission, the eNB may transmit over the radio frequency spectrum band during a portion of the transmission period following the DTX period 735 or 745 based on the performance of the CCA procedure 740.

In the example of FIG. 7 the eNB may lose the contention for the radio frequency spectrum band in the second frame 755, in which case the eNB will not transmit using the radio frequency spectrum band during the remainder of frame 755, nor perform any CCAs until the coordinated CCA interval at the end of frame 755, at which point the eNB may again win contention and begin transmitting, observing DTX periods 735 and 745 for frame 760. In this example, if the eNB were to detect that the radio frequency spectrum band channel is occupied following one of the CCAs 740, it would not transmit using the radio frequency spectrum band until a subsequent CCA 740 or 725 indicates that the radio frequency spectrum band is again available for transmission.

Figure 8:
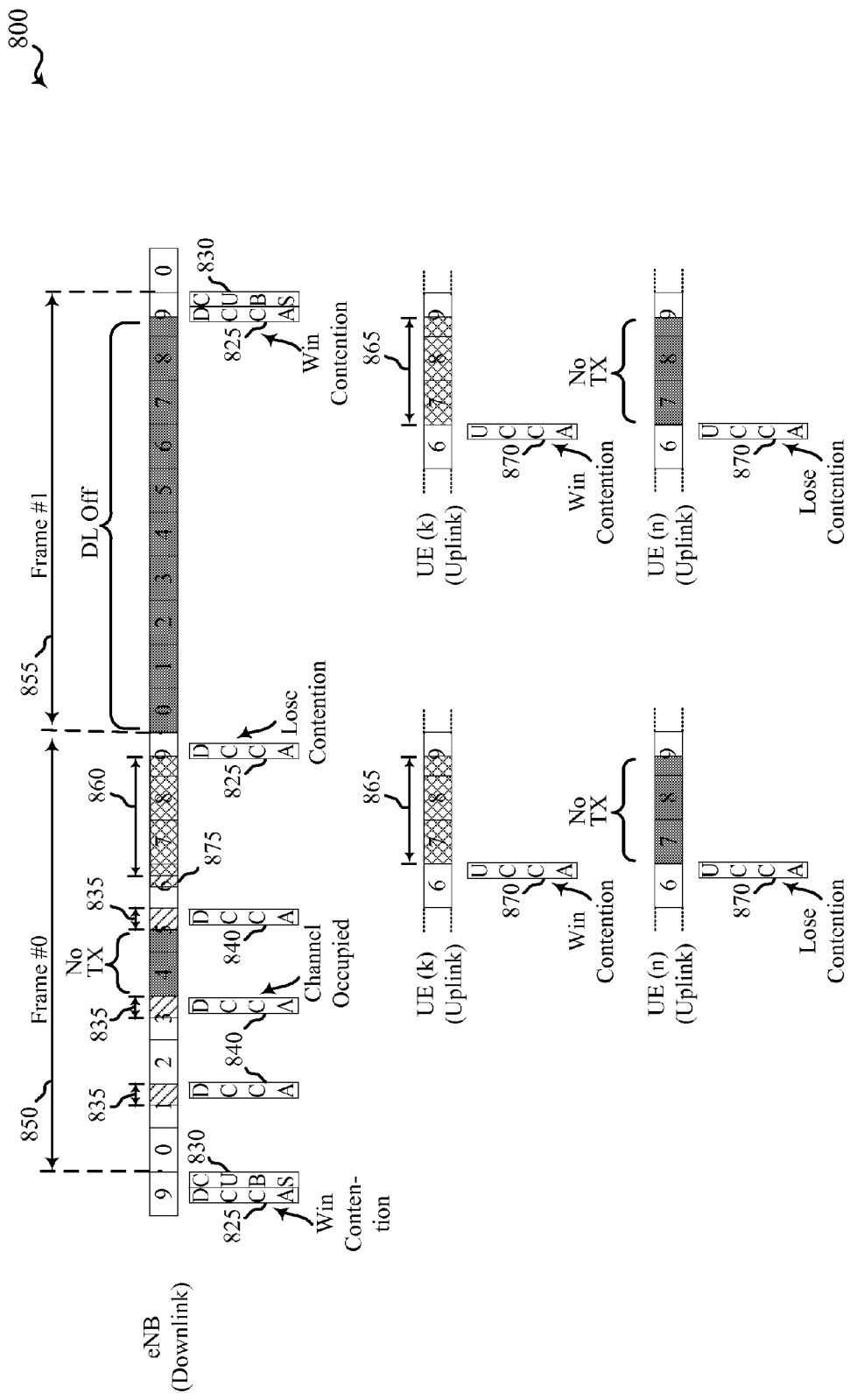
FIG. 8 is a block diagram conceptually illustrating DTX periods, downlink CCA intervals, and uplink transmissions, in accordance with aspects of the present disclosure.

FIG. 8 is a block diagram conceptually illustrating DTX periods, downlink CCA intervals, and uplink transmissions, in accordance with aspects of the present disclosure. In this aspect, a TDD example 800 is described in which successive frames 850 and 855 are observed by an eNB, such as access point, base station or eNB 105, 205, and/or 305 of FIGS. 1, 2, and/or 3. The eNB may win contention in a downlink CCA 825, and transmit a CUBS 830 prior to transmissions starting in initial frame 850. In this example, a plurality of DTX periods 835 are observed by eNB in frame 850, and the eNB will not transmit in the radio frequency spectrum band in the event that a CCA 840 indicates the radio frequency spectrum band is otherwise occupied. During one or more of DTX periods 835 and/or 860, uplink transmissions may be received at the eNB from UE (k), which may have performed an uplink CCA (UCCA) 870 and won contention to access the radio frequency spectrum band and transmit the uplink data during period 865. In some examples, a guard period 875 may be provided to allow for an uplink CCA 870.

In the example of FIG. 8, UE (n) loses an uplink CCA 870 and does not transmit nor attempt other uplink CCAs during period 865. In such a manner, the radio frequency spectrum band may continue to be utilized during the DTX periods observed by the eNB, which may reduce the overhead that results from the DTX periods. In some examples, the DTX periods 835 and 860, and corresponding downlink CCAs 825 and 840, may result in an overhead on the secondary cell (Scell) of approximately 40%, and utilizing one or more of the DTX periods 835 or 860 for uplink communications may, in some examples, reduce the overhead on the Scell to approximately 28%. In some examples, only DTX periods spanning multiple subframes may be used for uplink transmissions, while in other examples DTX periods of 0.5 milliseconds may be used for uplink transmissions, such as PUSCH and/or PUCCH transmissions, for example. In some deployments, subframe sizes may be modified to provide uplink transmissions. For example, an uplink subframe may not use a full 0.5 millisecond DTX period because the UE transmitting the data is required to perform a LBT procedure, such as an uplink CCA 870, prior to transmitting the uplink communication. In such cases, an uplink subframe size may be adjusted for use with the less than 0.5 millisecond DTX period.

As illustrated in FIG. 8, in the event that an eNB does not win the radio frequency spectrum band, such as illustrated in frame 855, a UE may still contend for uplink channel access to the eNB, as another eNB that won the radio frequency spectrum band will have a DTX period corresponding to an uplink transmission period 865. Thus, UE (k) may contend for the radio frequency spectrum band during an uplink CCA 870 and win the radio frequency spectrum band to transmit uplink data in frame 855, even though the eNB may not have won the corresponding downlink portion of frame 855.

Figure 9:
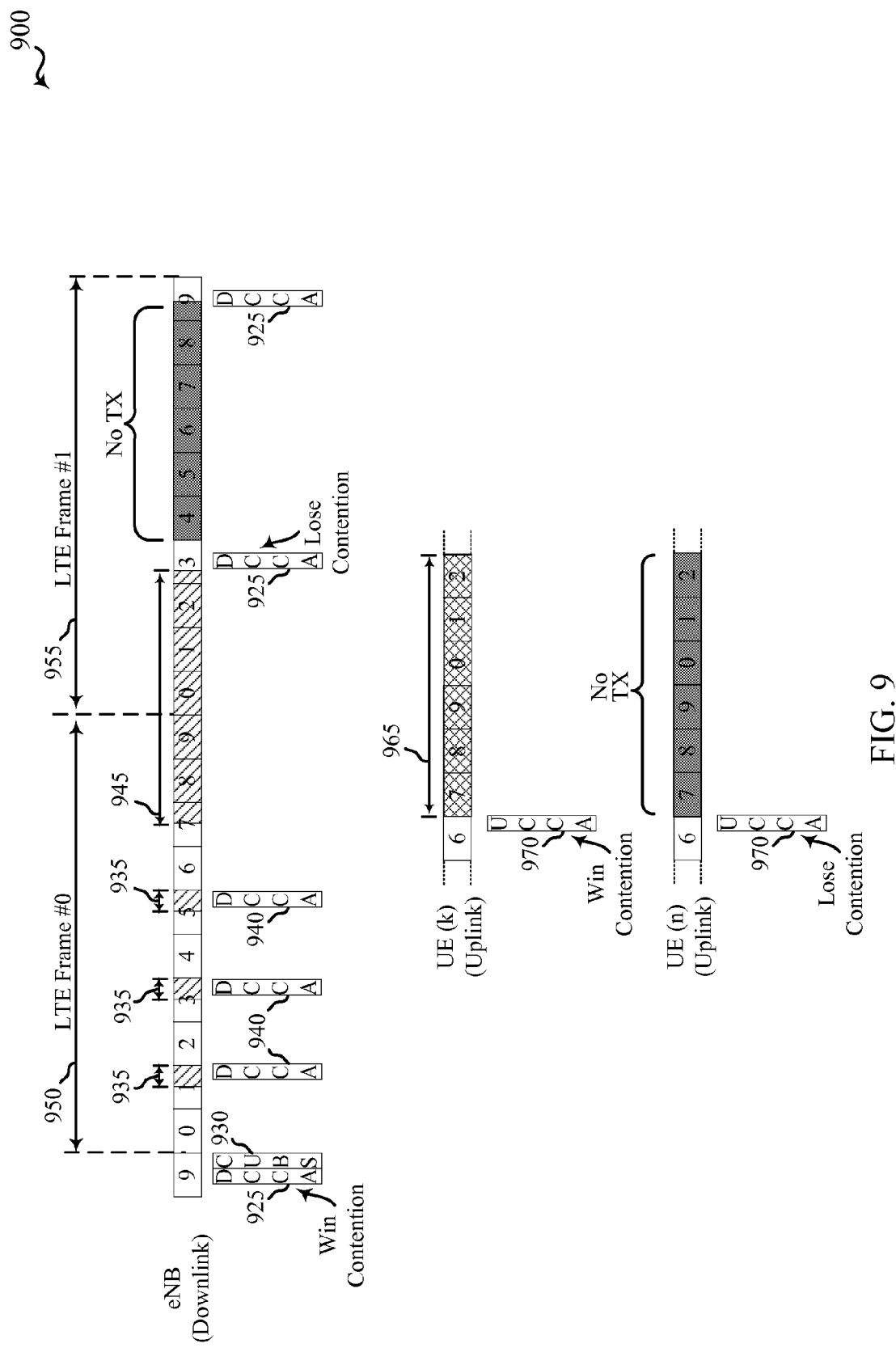
FIG. 9 is a block diagram conceptually illustrating DTX periods, downlink CCA intervals, and uplink transmissions, in accordance with aspects of the present disclosure.

FIG. 9 is a block diagram conceptually illustrating DTX periods, downlink CCA intervals, and uplink transmissions, in accordance with aspects of the present disclosure. In this aspect, a TDD example 900 is described in which successive frames 950 and 955 are observed by an eNB, such as access point, base station or eNB 105, 205, and/or 305 of FIGS. 1, 2, and/or 3. The eNB may win contention in a downlink CCA 925, and transmit a CUBS 930 prior to transmissions starting in initial frame 950. In this example, a plurality of DTX periods 935 are observed by eNB in frame 950, and the eNB will not transmit in the radio frequency spectrum band in the event that a CCA 940 indicates the radio frequency spectrum band is otherwise occupied. During one or more of DTX periods 935 and/or 945, uplink transmissions may be received at the eNB from UE (k), which may have performed an uplink CCA (UCCA) 970 and won contention to access the radio frequency spectrum band and transmit the uplink data during a period 965.

In the example of FIG. 9, UE(n) loses an uplink CCA 970 and does not transmit nor attempt other uplink CCAs during the period 965. In such a manner, the radio frequency spectrum band may continue to be utilized during the DTX periods observed by the eNB, which may reduce the overhead that results from the DTX periods. In some examples, the DTX periods 935 and 945, and corresponding downlink CCAs 925 and 940, may result in an overhead on the secondary cell (Scell) of approximately 45%, and utilizing one or more of the DTX periods 935 or 945 for uplink communications may, in some examples, reduce the overhead on the Scell to approximately 27%. In some examples, only DTX periods spanning multiple subframes may be used for uplink transmissions, while in other examples DTX periods of 0.5 milliseconds may be used for uplink transmissions, such as PUSCH and/or PUCCH transmissions, for example. In some deployments, similarly as discussed above, subframe sizes may be modified to provide uplink transmissions. For example, an uplink subframe may not use a full 0.5 millisecond DTX period because the UE transmitting the data is required to perform a LBT procedure, such as an uplink CCA 970, prior to transmitting the uplink communication. In such cases, an uplink subframe size may be adjusted for use with the less than 0.5 millisecond DTX period.

Figure 10A:
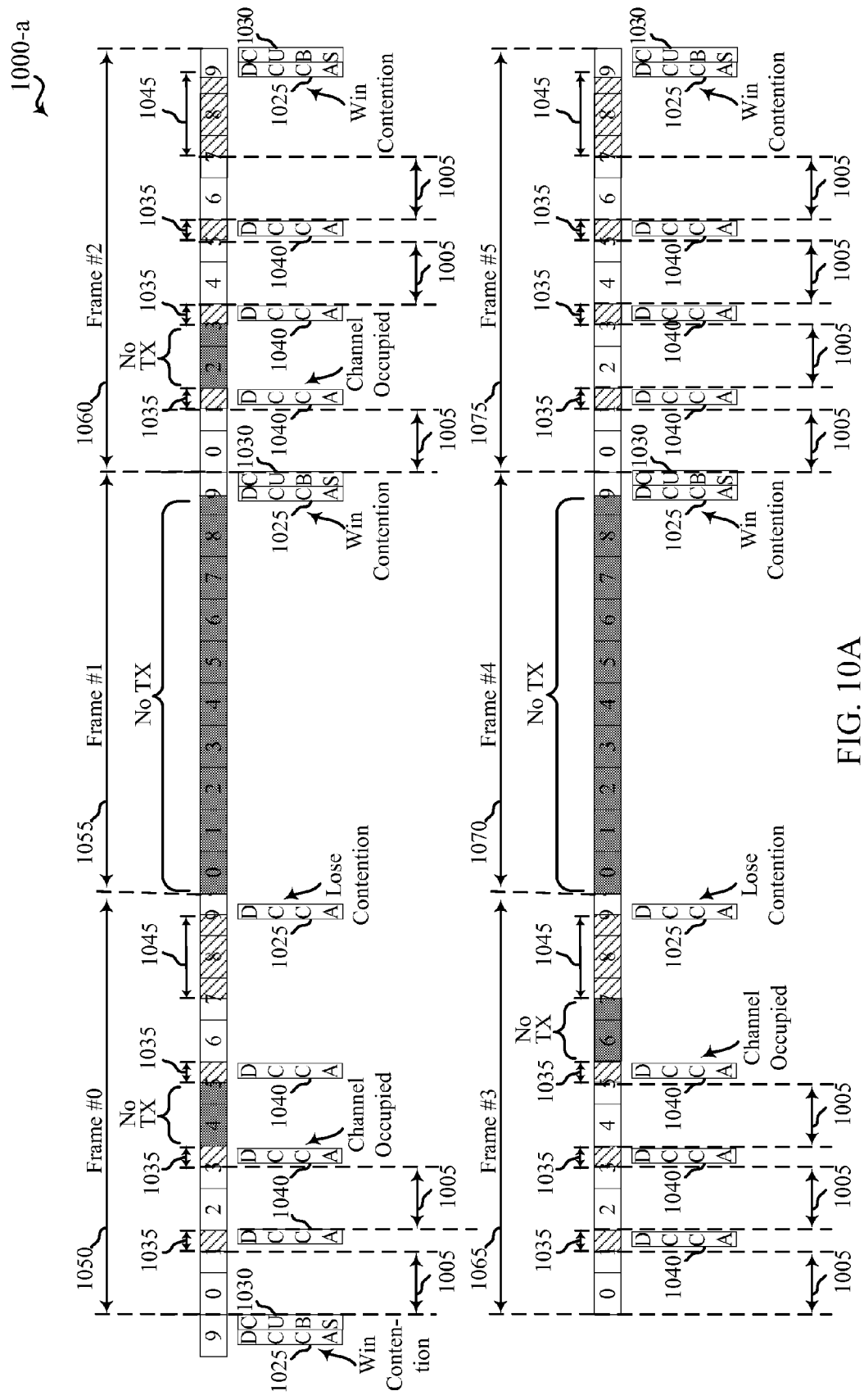
FIGS. 10A and 10B are block diagrams conceptually illustrating DTX periods, downlink CCA intervals, and channel measurement resources, in accordance with aspects of the present disclosure.
Figure 10B:
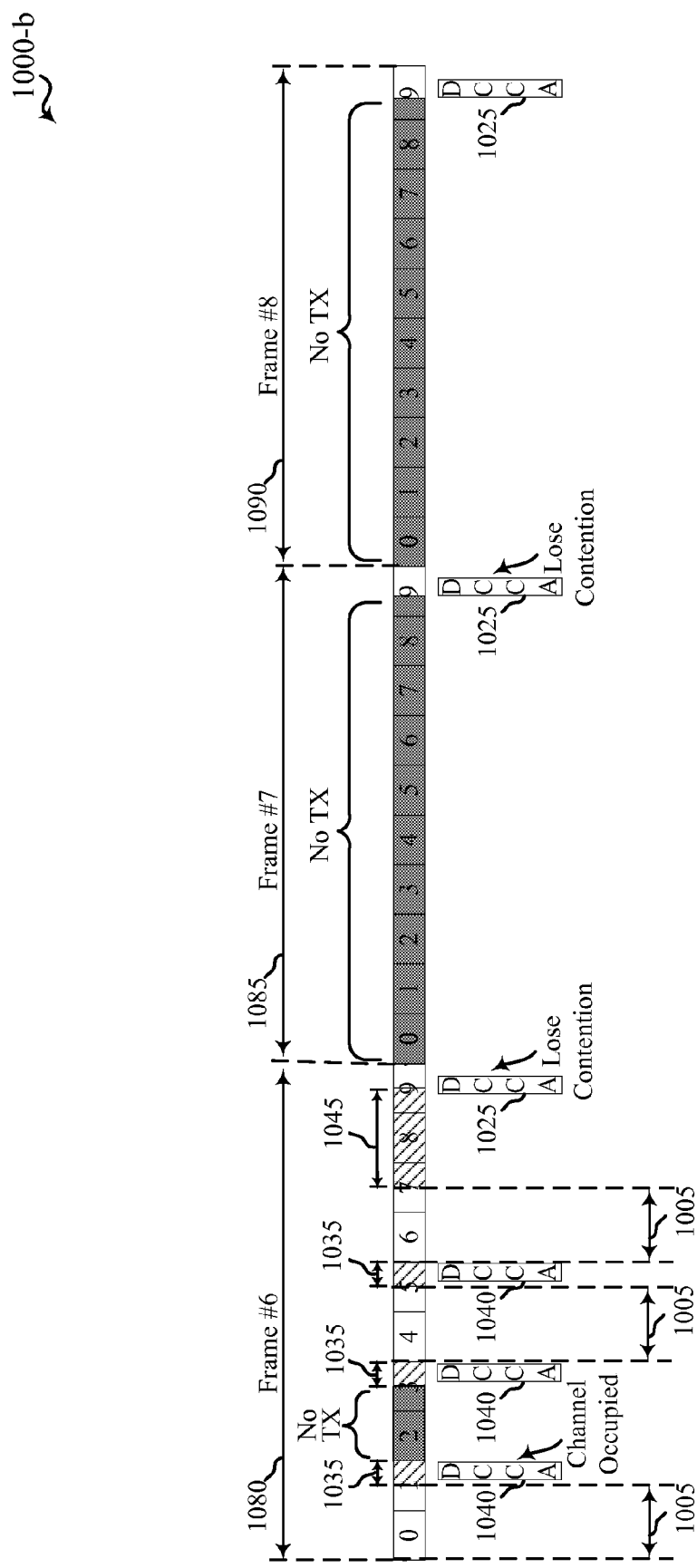

FIG. 10A and FIG. 10B are block diagrams conceptually illustrating DTX periods, downlink CCA intervals, and channel measurement resources, in accordance with aspects of the present disclosure. In this example, nine consecutive frames 1050 through 1090 are illustrated that may be observed by eNBs, such as access points, base stations or eNBs 105, 205, and/or 305 described above with respect to FIGS. 1, 2, and/or 3, that transmit using a radio frequency spectrum band requiring a LBT procedure prior to channel access. Each frame 1050 through 1090 may correspond to a synchronized LTE frame of one or more coordinated eNBs or other network nodes. Similarly as discussed above, an eNB may conduct a first downlink CCA 1025 immediately prior to the start of a transmission frame #0 1050, to contend for a radio frequency spectrum band for the subsequent transmission period associated with frame #0 1050. The first downlink CCA procedure 1025 may determine whether one or more of the plurality of operators, radar signals, or one or more other users are transmitting signals that would prohibit use of the radio frequency spectrum band. The downlink CCA 1025 may be performed during a contention period coordinated among a plurality of operators and/or a plurality of eNBs, for example. A CUBS 1030 is transmitted when an eNB wins the contention for the radio frequency spectrum band.

In this example, a plurality of DTX periods 1035 and 1045 are observed by the winner of the contention for the radio frequency spectrum band, and upon a successful completion of the first CCA procedure, a second CCA procedure 1040 may be performed by the winner of the contention during each DTX period 1035 and 1045 to determine availability of the radio frequency spectrum band. If the downlink CCA procedures 1040 indicate the radio frequency spectrum band is available for transmission, the eNB may transmit over the radio frequency spectrum band during a portion of the transmission period following the DTX period 1035 or 1045 based on the performance of the CCA procedure 1040.

In the example of FIG. 10A and FIG. 10B, the eNB may lose the contention for the radio frequency spectrum band for frame #1 1055, in which case the eNB will not transmit using the radio frequency spectrum band during transmission period associated with frame #1 1055, nor perform any CCAs until the coordinated CCA interval at the end of frame #1 1055, at which point the eNB may again win contention and begin transmitting, observing DTX periods 1035 and 1045 for frame #2 1060. In the examples 1000-a and 1000-b of FIGS. 10A and 10B, one or more of rank indicator (RI) or channel state information (CSI), reference signal received power (RSRP), or reference signal received quality (RSRQ) measurements may be performed by a UE. The downlink resources used for such measurements may be selected so as to provide that measurements are done on subframes where the eNB is transmitting a CSI reference signal (CSI-RS). In the examples 1000-a and 1000-b, resources 1005 are selected for such measurements. In some examples, resources 1005 may include a first data subframe following a successful downlink CCA 1025, as there will be a high likelihood that data will be transmitted from the eNB during this subframe. Other resources 1005 are selected based on successful downlink CCAs 1040. Interference measurements, in some examples, may be performed in all subframes, and the first subframe associated with resources 1005 may be used for interference measurement resource (IMR) measurements. Resources 1005 may also, in some examples, be selected to account for one or more CCA Exempt Transmission (CET). A CET may have a duration of less than one millisecond, and may be transmitted in one or more subframes within a frame. In examples where CETs may be transmitted, the CET transmission may impact interference measurements, and resources 1005 may be selected to account for one or more CET.

Figure 11A:
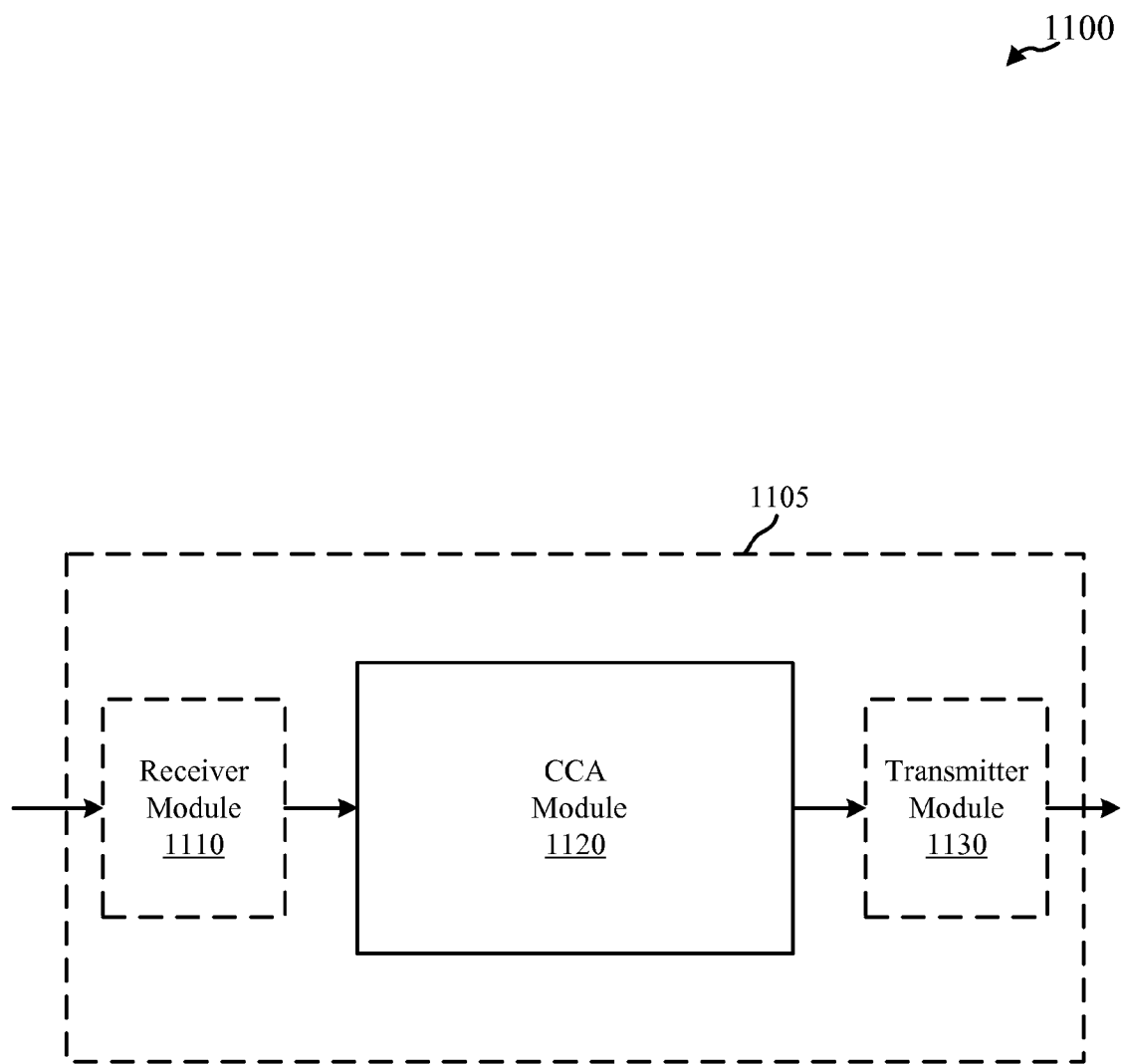
FIGS. 11A and 11B are block diagrams conceptually illustrating devices, such as base stations or UEs, for use in wireless communications in accordance with aspects of the present disclosure.
Figure 11B:
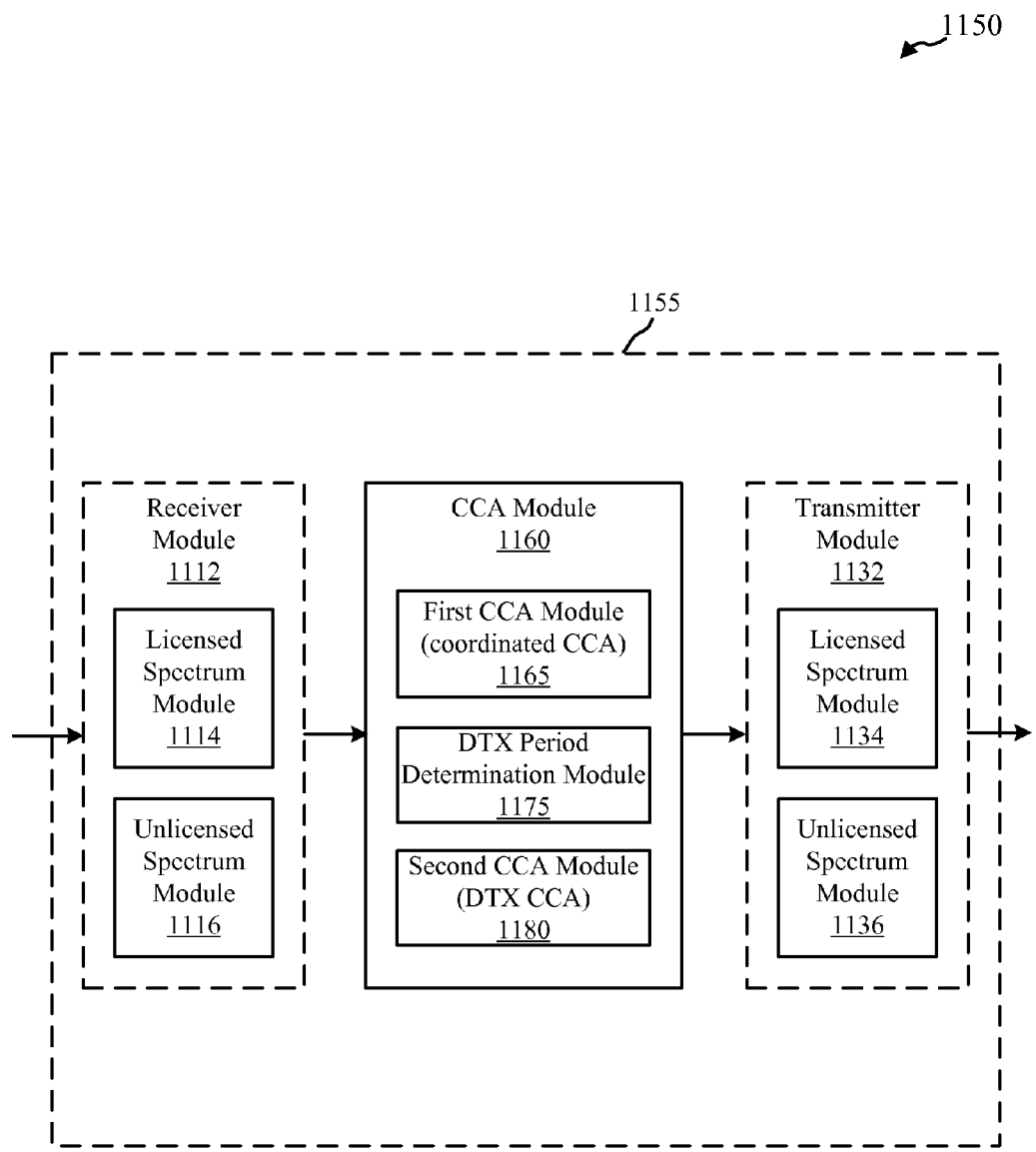

FIGS. 11A and 11B are block diagrams conceptually illustrating devices, such as base stations or UEs, for use in wireless communications in accordance with aspects of the present disclosure. With reference first to FIG. 11A, a block diagram 1100 illustrates a device 1105 for use in wireless communications in accordance with various examples. In some examples, the device 1105 may be an example of one or more aspects of the access points, base stations or eNBs 105, 205, 305, and/or UEs 115, 215, 315 described with reference to FIGS. 1, 2, and/or 3. The device 1105 may also be a processor. The device 1105 may include a receiver module 1110, an CCA module 1120, and/or a transmitter module 1130. Each of these components may be in communication with each other.

The components of the device 1105 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may be or include a radio frequency (RF) receiver, such as an RF receiver operable to receive transmissions in a licensed radio frequency spectrum band and/or an unlicensed radio frequency spectrum band. The receiver module 1110 may be used to receive various types of data and/or control signals (i.e., transmissions) over one or more communication links of a wireless communications system including the licensed radio frequency spectrum band and unlicensed radio frequency spectrum band, such as one or more communication links 125, 220 through 240, and/or 325 of the wireless communications system 100, 200, and/or 300 described with reference to FIGS. 1, 2, and/or 3.

In some examples, the transmitter module 1130 may be or include an RF transmitter, such as an RF transmitter operable to transmit in the licensed radio frequency spectrum band and/or the unlicensed radio frequency spectrum band. The transmitter module 1130 may be used to transmit various types of data and/or control signals (i.e., transmissions) over one or more communication links of a wireless communications system, such as one or more communication links 125, 220 through 240, and/or 325 of the wireless communications system 100, 200, and/or 300 described with reference to FIGS. 1, 2, and/or 3.

In some examples, the CCA module 1120 may configure and/or perform a CCA and DTX periods for performance of the CCA based on an eNB that won downlink contention. When the CCA module 1120 determines that the unlicensed radio frequency spectrum band is to be used in communications, downlink CCAs may be performed that include CCAs during coordinated contention periods, and CCAs during DTX periods within transmission periods, such as described above with respect to FIGS. 3-10, for example.

Referring now to FIG. 11B, a block diagram 1150 illustrates a device 1155 for use in wireless communications, in accordance with various aspects of the present disclosure. In some examples, the device 1155 may be an example of one or more aspects of the access points, base stations or eNBs 105, 205, 305 and/or UEs 115, 215, 315 described with reference to FIGS. 1, 2 and/or 3. The device 1155 may also be a processor. The device 1155 may include a receiver module 1112, a CCA module 1160, and/or a transmitter module 1132. Each of these components may be in communication with each other.

The components of the device 1155 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1112 may be an example of the receiver module 1110 of FIG. 11A. The receiver module 1112 may be or include a radio frequency (RF) receiver, such as an RF receiver operable to receive transmissions in a licensed radio frequency spectrum band and/or an unlicensed radio frequency spectrum band. The RF receiver may include separate receivers for the licensed radio frequency spectrum band and the unlicensed radio frequency spectrum band. The separate receivers may in some cases take the form of a licensed spectrum module 1114 and an unlicensed spectrum module 1116. The receiver module 1112, including the licensed spectrum module 1114 and the unlicensed spectrum module 1116, may be used to receive various types of data and/or control signals (i.e., transmissions) over one or more communication links of a wireless communications system including the licensed radio frequency spectrum band and unlicensed radio frequency spectrum band, such as one or more communication links 125, 220 through 240, and/or 325 of the wireless communications system 100, 200 and/or 300 described with reference to FIGS. 1, 2 and/or 3.

In some examples, the transmitter module 1132 may be an example of the transmitter module 1130 of FIG. 11A. The transmitter module 1132 may be or include an RF transmitter, such as an RF transmitter operable to transmit in the licensed radio frequency spectrum band and/or the unlicensed radio frequency spectrum band. The RF transmitter may include separate transmitters for the licensed radio frequency spectrum band and the unlicensed radio frequency spectrum band. The separate transmitters may in some cases take the form of a licensed spectrum module 1134 and an unlicensed spectrum module 1136. The transmitter module 1132 may be used to transmit various types of data and/or control signals (i.e., transmissions) over one or more communication links of a wireless communications system, such as one or more communication links 125, 220 through 240, and/or 325 of the wireless communications system 100, 200 and/or 300 described with reference to FIGS. 1, 2 and/or 3.

The CCA module 1160 may be an example of the CCA module 1120 described with reference to FIG. 11A and may include a first CCA module 1165, a DTX period determination module 1175, and/or a second CCA module 1180. Each of these components may be in communication with each other.

In some examples, the first CCA module 1165 may perform first CCA procedures to contend for a radio frequency spectrum band for a transmission period. The first CCA procedure may be a procedure that is performed during a contention period coordinated among a plurality of eNBs and/or operators. The CCAs may be performed during a special subframe identified for a communications channel transmitted over the unlicensed radio frequency spectrum band. The first CCA module may determine if the device 1155 won contention for the radio frequency spectrum band for the transmission period, and initiate transmission of a CUBS to signal that the device 1155 has won the radio frequency spectrum band channel. The DTX period determination module 1175 may determine a timing and duration of DTX periods during a transmission period. The DTX periods may be determined based on signal characteristics of the radio frequency spectrum band and one or more priority users of the radio frequency spectrum band, such as radar systems, for example. The DTX periods may be determined as described above with respect to FIGS. 3-10, for example.

In some examples, the second CCA module 1180 may perform one or more second CCA procedures during one or more DTX periods to determine continued availability of the radio frequency spectrum band. The CCA intervals may correspond to the DTX periods and in the event that the radio frequency spectrum band is not available based on a CCA performed during a DTX period, the device 1155 may discontinue transmissions from the unlicensed spectrum module 1136 until a subsequent CCA indicates that the radio frequency spectrum band is again available, such as described above with respect to FIGS. 3-10, for example.

Figure 12:
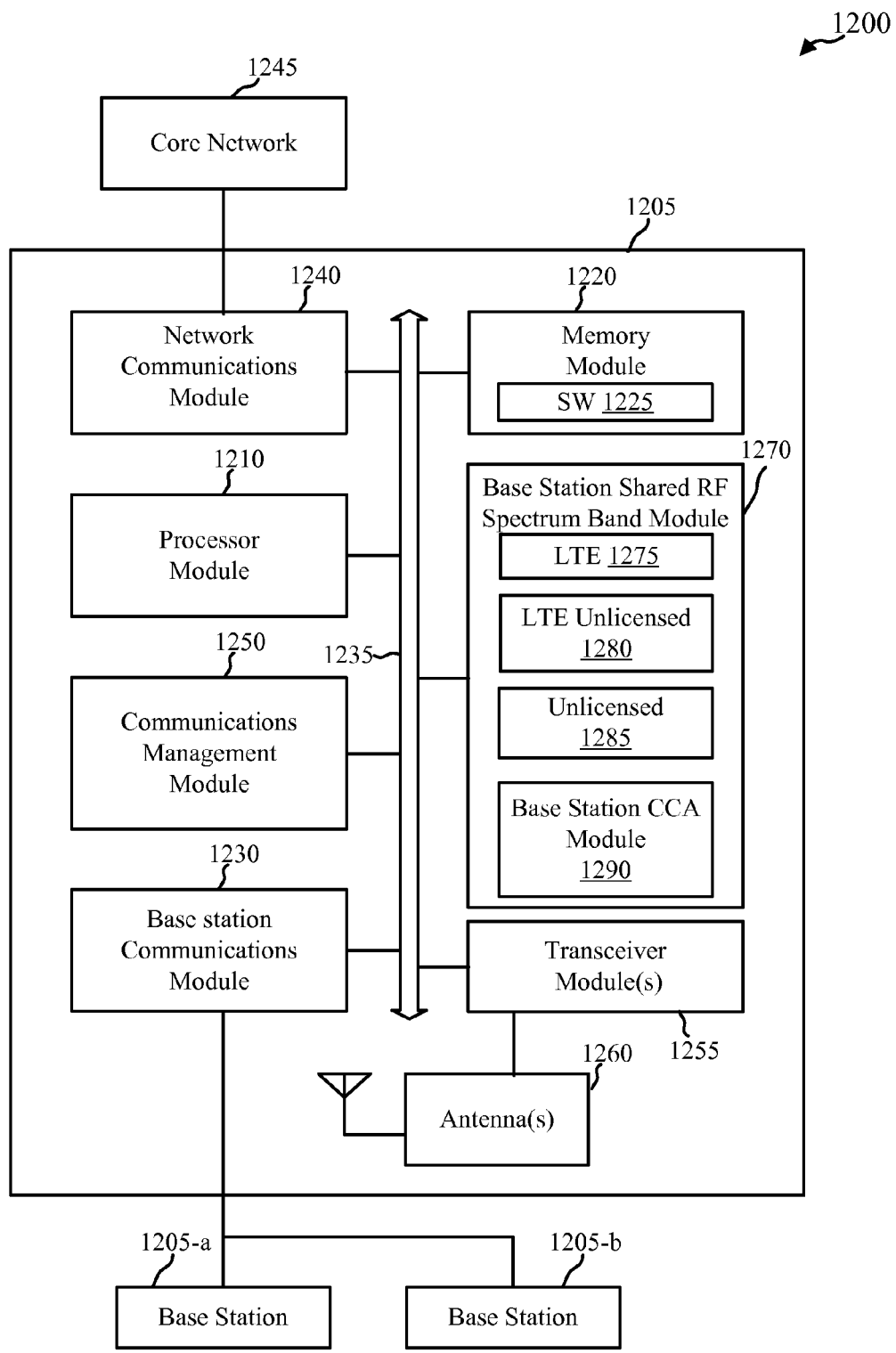
FIG. 12 is a block diagram conceptually illustrating a design of a base station, in accordance with aspects of the present disclosure.

FIG. 12 is a block diagram conceptually illustrating a design of a base station, in accordance with aspects of the present disclosure. In FIG. 12, a block diagram 1200 is shown that illustrates a base station 1205 configured for LTE-based communications in an unlicensed radio frequency spectrum band. In some examples, the base station 1205 may be an example of one or more aspects of the access points, base stations, eNBs, or devices 105, 205, 305, 1105, and/or 1155 described with reference to FIGS. 1, 2, 3, 11A, and/or 11B. The base station 1205 may be configured to implement at least some of the CCA features and functions described with respect to FIGS. 1, 2, 3, 4, 5, 6, 7, 8, 9, 10A, 10B, 11A, and/or 11B. The base station 1205 may include a processor module 1210, a memory module 1220, at least one transceiver module (represented by transceiver module(s) 1255), at least one antenna (represented by antenna(s) 1260), and/or a base station shared RF spectrum band module 1270. The base station 1205 may also include one or both of a base station communications module 1230 and a network communications module 1240. Each of these components may be in communication with each other, directly or indirectly, over one or more buses 1235.

The memory module 1220 may include random access memory (RAM) and/or read-only memory (ROM). The memory module 1220 may store computer-readable, computer-executable software (SW) code 1225 containing instructions that are configured to, when executed, cause the processor module 1210 to perform various functions described herein for using LTE-based communications in a licensed and/or unlicensed radio frequency spectrum band, including the performance of CCAs and DTX determination for the CCA performance. Alternatively, the software code 1225 may not be directly executable by the processor module 1210 but be configured to cause the base station 1205, e.g., when compiled and executed, to perform various of the functions described herein.

The processor module 1210 may include an intelligent hardware device, e.g., a central processing unit (CPU), a microcontroller, an ASIC, etc. The processor module 1210 may process information received through the transceiver module(s) 1255, the base station communications module 1230, and/or the network communications module 1240. The processor module 1210 may also process information to be sent to the transceiver module(s) 1255 for transmission through the antenna(s) 1260, to the base station communications module 1230 for transmission to one or more other base stations or eNBs 1205-*a* and 1205-*b*, and/or to the network communications module 1240 for transmission to a core network 1245, which may be an example of aspects of the core network 130 described with reference to FIG. 1. The processor module 1210 may handle, alone or in connection with the base station shared RF spectrum band module 1270, various aspects of using LTE-based communications in a licensed and/or unlicensed radio frequency spectrum band, including the performance of CCAs and/or determination of DTX periods within transmission periods second CCA procedures that may be used to determine availability of a radio frequency spectrum band, such as described above with respect to FIGS. 3-10.

The transceiver module(s) 1255 may include a modem configured to modulate the packets and provide the modulated packets to the antenna(s) 1260 for transmission, and to demodulate packets received from the antenna(s) 1260. The transceiver module(s) 1255 may be implemented as one or more transmitter modules and one or more separate receiver modules. The transceiver module(s) 1255 may support communications in at least one licensed radio frequency spectrum band and in at least one unlicensed radio frequency spectrum band. The transceiver module(s) 1255 may be configured to communicate bi-directionally, via the antenna(s) 1260, with one or more of the UEs or devices 115, 215, and/or 315 described with reference to FIGS. 1, 2, and/or 3, for example. The base station 1205 may typically include multiple antennas 1260 (e.g., an antenna array). The base station 1205 may communicate with the core network 1245 through the network communications module 1240. The base station 1205 may communicate with other base stations or eNBs, such as the base stations 1205-*a* and/or 1205-*b*, using the base station communications module 1230.

According to the architecture of FIG. 12, the base station 1205 may further include a communications management module 1250. The communications management module 1250 may manage communications with other base stations, eNBs, and/or devices. The communications management module 1250 may be in communication with some or all of the other components of the base station 1205 via the bus or buses 1235. Alternatively, functionality of the communications management module 1250 may be implemented as a component of the transceiver module(s) 1255, as a computer program product, and/or as one or more controller elements of the processor module 1210.

The base station shared RF spectrum band module 1270 may be configured to perform and/or control some or all of the base station functions or aspects described with reference to FIGS. 1, 2, 3, 4, 5, 6, 7, 8, 9, 10A, 10B, 11A, and/or 11B related to using LTE-based communications in a licensed and/or unlicensed radio frequency spectrum band. For example, the base station shared RF spectrum band module 1270 may be configured to support CCA operations according to coordinated contention intervals and DTX periods. The base station shared RF spectrum band module 1270 may include an LTE module 1275 configured to handle LTE communications in a licensed radio frequency spectrum band, an LTE unlicensed module 1280 configured to handle LTE communications in an unlicensed radio frequency spectrum band and CCAs, and/or an unlicensed module 1285 configured to handle communications other than LTE communications in an unlicensed radio frequency spectrum band. The base station shared RF spectrum band module 1270 may also include a base station CCA module 1290 configured to provide, for example, any of the CCA functions described with reference to FIGS. 1, 2, 3, 4, 5, 6, 7, 8, 9, 10A, 10B, 11A, and/or 11B. The base station CCA module 1290 may be an example of similar modules (e.g., module 1120 and/or module 1160) described with reference to FIGS. 11A and/or 11B. The base station shared RF spectrum band module 1270, or portions of it, may include a processor and/or some or all of the functionality of the base station shared RF spectrum band module 1270 may be performed by the processor module 1210 and/or in connection with the processor module 1210.

Figure 13:
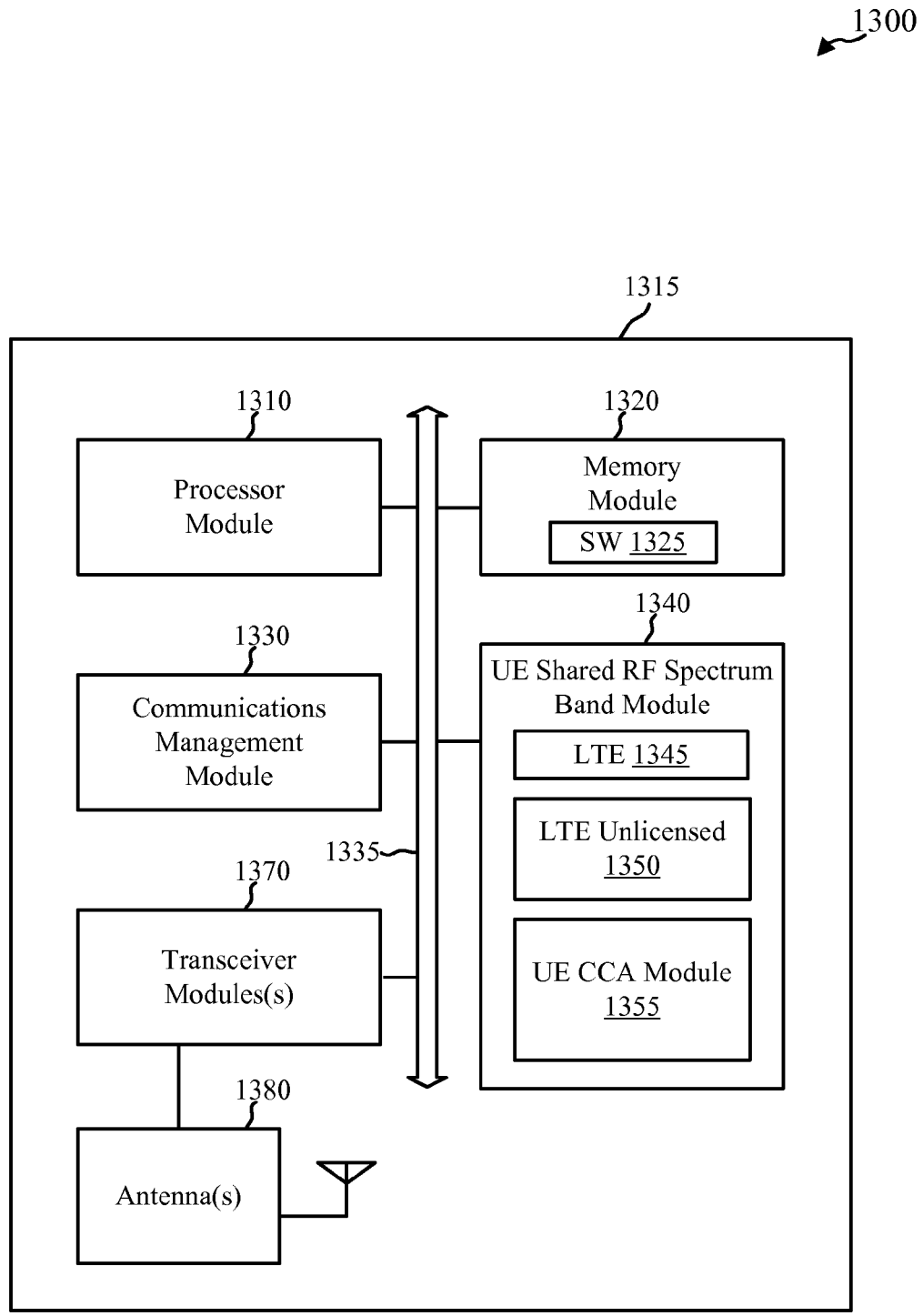
FIG. 13 is a block diagram conceptually illustrating a design of a UE, in accordance with aspects of the present disclosure.

FIG. 13 is a block diagram conceptually illustrating a design of a UE, in accordance with aspects of the present disclosure. In FIG. 13, a block diagram 1300 is shown that illustrates a UE 1315 configured for LTE-based communications in an unlicensed radio frequency spectrum band. The UE 1315 may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 1315 may have an internal power supply (not shown), such as a small battery, to facilitate mobile operation. In some examples, the UE 1315 may be an example of one or more of the UEs or devices 115, 215, and/or 315 described with reference to FIGS. 1, 2 and/or 3. The UE 1315 may be configured to communicate with one or more of the access points, base stations, eNBs or devices 105, 205, 305, 1105, 1155, and/or 1205 described with reference to FIGS. 1, 2, 3, 11A, 11B, and/or 12.

The UE 1315 may include a processor module 1310, a memory module 1320, at least one transceiver module (represented by transceiver module(s) 1370), at least one antenna (represented by antenna(s) 1380), and/or a UE shared RF spectrum band module 1340. Each of these components may be in communication with each other, directly or indirectly, over one or more buses 1335.

The memory module 1320 may include RAM and/or ROM. The memory module 1320 may store computer-readable, computer-executable software (SW) code 1325 containing instructions that are configured to, when executed, cause the processor module 1310 to perform various functions described herein for using LTE-based communications in a licensed and/or unlicensed radio frequency spectrum band. Alternatively, the software code 1325 may not be directly executable by the processor module 1310 but be configured to cause the UE 1315 (e.g., when compiled and executed) to perform various of the UE functions described herein.

The processor module 1310 may include an intelligent hardware device, e.g., a CPU, a microcontroller, an ASIC, etc. The processor module 1310 may process information received through the transceiver module(s) 1370 and/or information to be sent to the transceiver module(s) 1370 for transmission through the antenna(s) 1380. The processor module 1310 may handle, alone or in connection with the UE shared RF spectrum band module 1340, various aspects of using LTE-based communications in a licensed and/or unlicensed radio frequency spectrum band.

The transceiver module(s) 1370 may be configured to communicate bi-directionally with base stations or eNBs. The transceiver module(s) 1370 may be implemented as one or more transmitter modules and one or more separate receiver modules. The transceiver module(s) 1370 may support communications in at least one licensed radio frequency spectrum band and in at least one unlicensed radio frequency spectrum band. The transceiver module(s) 1370 may include a modem configured to modulate the packets and provide the modulated packets to the antenna(s) 1380 for transmission, and to demodulate packets received from the antenna(s) 1380. While the UE 1315 may include a single antenna, there may be examples in which the UE 1315 may include multiple antennas 1380.

According to the architecture of FIG. 13, the UE 1315 may further include a communications management module 1330. The communications management module 1330 may manage communications with various base stations or eNBs. The communications management module 1330 may be a component of the UE 1315 in communication with some or all of the other components of the UE 1315 over the one or more buses 1335. Alternatively, functionality of the communications management module 1330 may be implemented as a component of the transceiver module(s) 1370, as a computer program product, and/or as one or more controller elements of the processor module 1310.

The UE shared RF spectrum band module 1340 may be configured to perform and/or control some or all of the UE functions or aspects described in FIGS. 1, 2, 3, 4, 5, 6, 7, 8, 9, 10A, 10B, 11A, and/or 11B related to using LTE-based communications in a licensed and/or unlicensed radio frequency spectrum band. For example, the UE shared RF spectrum band module 1340 may be configured to perform a CCA to gain channel access according to a coordinated contention interval and perform periodic DTX and CCAs to determine that the radio frequency spectrum band is available for transmission. The UE shared RF spectrum band module 1340 may include an LTE module 1345 configured to handle LTE communications in a licensed radio frequency spectrum band, an LTE unlicensed module 1350 configured to handle LTE communications in an unlicensed radio frequency spectrum band, and/or a UE CCA module 1355. The UE CCA module 1355 may be an example of similar modules (e.g., module 1120 and/or module 1160) described with reference to FIGS. 11A and/or 11B, and may perform CCAs according to coordinated contention intervals to gain access to a radio frequency spectrum band and transmit to a base station using the radio frequency spectrum band. The UE shared RF spectrum band module 1340, or portions of it, may include a processor and/or some or all of the functionality of the UE shared RF spectrum band module 1340 may be performed by the processor module 1310 and/or in connection with the processor module 1310.

Figure 14:
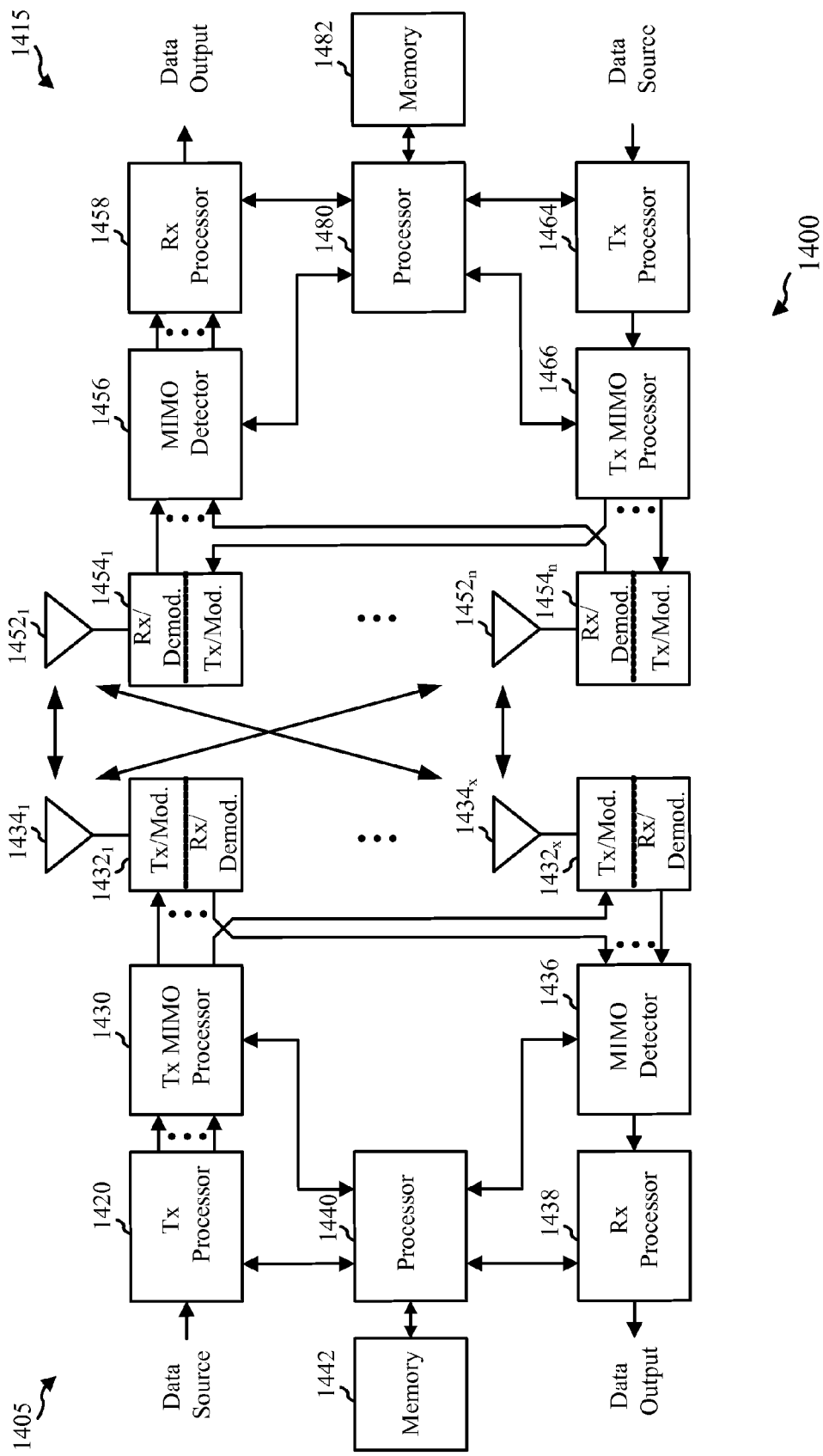
FIG. 14 is a block diagram conceptually illustrating an example of a base station and a UE, in accordance with aspects of the present disclosure.

FIG. 14 is a block diagram conceptually illustrating an example of a base station 1405 and a UE 1415, in accordance with aspects of the present disclosure. The base station 1405 and UE 1415 may be part of a wireless communications system 1400. This wireless communications system 1400 may illustrate aspects of the wireless communications system 100 of FIG. 1, 200 of FIG. 2, and/or 300 of FIG. 3. For example, the base station 1405 may be an example of one or more of the access points, base stations, or eNBs 105, 205, 305, and/or 1205 described above with respect to FIGS. 1, 2, 3, and/or 12, and the UE 1415 may be an example of one or more of the UEs 115, 215, 315, and/or 1315 described above with respect to FIGS. 1, 2, 3 and/or 13.

The base station 1405 may be equipped with base station antennas 1434-1 through 1434-x, where x is a positive integer, and the UE 1415 may be equipped with UE antennas 1452-1 through 1452-n. In the wireless communications system 1400, the base station 1405 may be able to send data over multiple communication links at the same time. Each communication link may be called a "layer" and the "rank" of the communication link may indicate the number of layers used for communication. For example, in a 2×2 MIMO system where base station 1405 transmits two "layers," the rank of the communication link between the base station 1405 and the UE 1415 is two.

At the base station 1405, a base station transmit processor 1420 may receive data from a base station data source and control information from a base station processor 1440. The control information may be for the PBCH, PCFICH, PHICH, PDCCH, etc. The data may be for the PDSCH, etc. The base station transmit processor 1420 may process (e.g., encode and symbol map) the data and control information to obtain data symbols and control symbols, respectively. The base station transmit processor 1420 may also generate reference symbols, e.g., for the PSS, SSS, and cell-specific reference signal. A base station transmit (TX) MIMO processor 1430 may perform spatial processing (e.g., precoding) on data symbols, control symbols, and/or reference symbols, if applicable, and may provide output symbol streams to the base station transmit modulators 1432-1 through 1432-x. Each base station modulator 1432 may process a respective output symbol stream (e.g., for OFDM, etc.) to obtain an output sample stream. Each base station modulator 1432 may further process (e.g., convert to analog, amplify, filter, and upconvert) the output sample stream to obtain a downlink (DL) signal. In one example, DL signals from base station modulators 1432$_1$ through 1432$_x$ may be transmitted via the base station antennas 1434-1 through 1434-x, respectively.

At the UE 1415, the UE antennas 1452$_1$ through 1452$_n$ may receive the DL signals from the base station 1405 and may provide the received signals to the UE demodulators 1454$_1$ through 1454$_n$, respectively. Each UE demodulator 1454 may condition (e.g., filter, amplify, downconvert, and digitize) a respective received signal to obtain input samples. Each UE demodulator 1454 may further process the input samples (e.g., for OFDM, etc.) to obtain received symbols. A UE MIMO detector 1456 may obtain received symbols from all the demodulators 1454$_1$ through 1454$_n$, perform MIMO detection on the received symbols if applicable, and provide detected symbols. A UE receive (Rx) processor 1458 may process (e.g., demodulate, deinterleave, and decode) the detected symbols, providing decoded data for the UE 1415 to a data output, and provide decoded control information to a UE processor 1480, or UE memory 1482.

On the uplink (UL), at the UE 1415, a UE transmit processor 1464 may receive and process data from a UE data source. The UE transmit processor 1464 may also generate reference symbols for a reference signal. The symbols from the UE transmit processor 1464 may be precoded by a UE transmit MIMO processor 1466 if applicable, further processed by the UE demodulators 1454$_1$ through 1454$_n$ (e.g., for SC-FDMA, etc.), and be transmitted to the base station 1405 in accordance with the transmission parameters received from the base station 1405. At the base station 1405, the UL signals from the UE 1415 may be received by the base station antennas 1434, processed by the base station demodulators 1432, detected by a base station MIMO detector 1436 if applicable, and further processed by a base station receive processor. The base station receive processor 1438 may provide decoded data to a base station data output and to the base station processor 1440. The components of the UE 1415 may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 1400. Similarly, the components of the base station 1405 may, individually or collectively, be implemented with one or more Application Specific Integrated Circuits (ASICs) adapted to perform some or all of the applicable functions in hardware. Each of the noted components may be a means for performing one or more functions related to operation of the wireless communications system 1400.

The communication networks that may accommodate some of the various disclosed examples may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

In one example, the base station 1405 and/or the UE 1415 includes means for performing a first CCA procedure to contend for a radio frequency spectrum band for a transmission period, wherein the first CCA procedure is performed before the transmission period during a contention period coordinated among a plurality of operators, means for determining whether contention was won for the radio frequency spectrum band for the transmission period based on the first CCA procedure, and means for performing a second CCA procedure, upon a successful completion of the first CCA procedure, to determine availability of the radio frequency spectrum band, wherein the second CCA procedure is performed during a DTX period in the transmission period. In one aspect, the aforementioned means may be the base station processor 1440, the base station memory 1442, the base station transmit processor 1420, base station receiver processor 1438, the base station modulators/demodulators 1432, and the base station antennas 1434 of the base station 1405 configured to perform the functions recited by the aforementioned means. In another aspect, the aforementioned means may be the UE processor 1480, the UE memory 1482, the UE transmit processor 1464, UE receiver processor 1458, the UE modulators/demodulators 1454, and the UE antennas 1452 of the UE 1415 configured to perform the functions recited by the aforementioned means.

Figure 15:
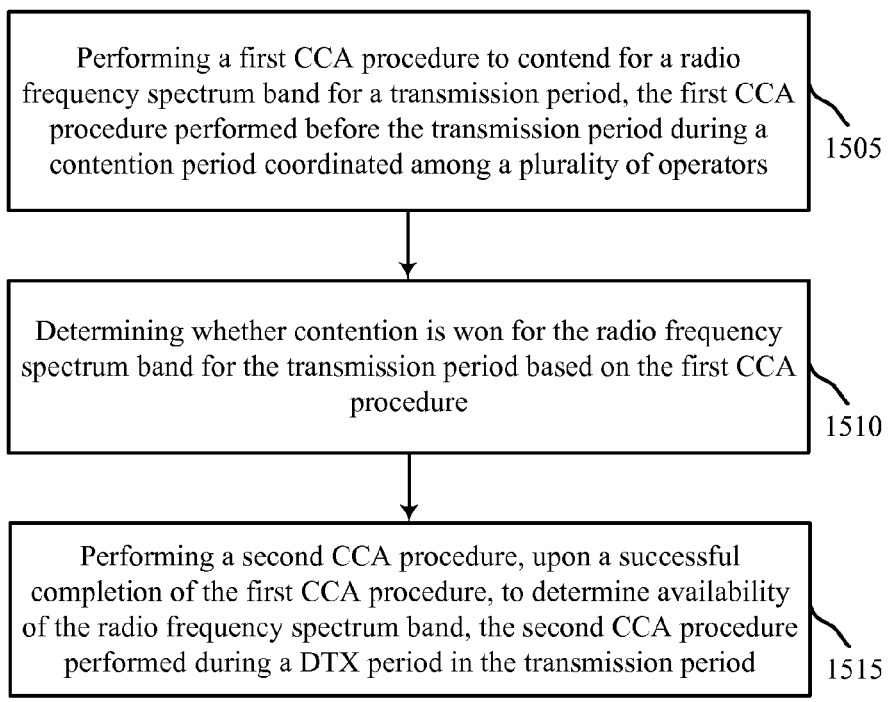
FIG. 15 is a flowchart conceptually illustrating an example of a method of wireless communication, in accordance with aspects of the present disclosure.

FIG. 15 is a flowchart conceptually illustrating an example of a method of wireless communication, in accordance with aspects of the present disclosure. For clarity, the method 1500 is described below with reference to ones of the access points, base stations, eNBs or devices 105, 205, 305, 1105, 1155, 1205 and/or 1405 described with reference to FIGS. 1, 2, 3, 11A, 11B, 12, and/or 14. In one example, a base station may execute one or more sets of codes to control the functional elements of the base station to perform the functions described below.

At block 1505, a first CCA procedure is performed to contend for a radio frequency spectrum band for a transmission period, the first CCA procedure performed before the transmission period during a contention period coordinated among a plurality of operators. In some examples, the base stations or the same and/or different operators may be coordinated to perform contention-based channel access to the radio frequency spectrum band. If a base station does not win contention, the base station may again attempt to win the channel in a next contention period coordinated among the plurality of operators. According to some examples, the contention period coordinated among the plurality of operators may be a special subframe that is synchronized with an LTE frame boundary. The operation(s) at block 1505 may in some cases be performed using the CCA module 1120 and/or 1160 in conjunction with receiver modules 1110 and 1112 and transmitter modules 1130 and 1132, described with reference to FIGS. 11A and/or 11B, first CCA module 1165 described with reference to FIG. 11B, the base station shared RF spectrum band module 1270 in conjunction with transceiver module(s) 1255 and antenna(s) 1260, described with reference to FIG. 12, and/or the processor 1440 and related components described with reference to FIG. 14.

At block 1510, it is determined that contention was won for the radio frequency spectrum band for the transmission period based on the first CCA procedure. In some examples, a CUBS may be monitored and used to determine that the radio frequency spectrum band has or has not been obtained by another base station, and a CUBS transmitted when it is determined that the radio frequency spectrum band is available. The operation(s) at block 1510 may in some cases be performed using the CCA module 1120 and/or 1160 described with reference to FIGS. 11A and/or 11B, first CCA module 1165 described with reference to FIG. 11B, the base station shared RF spectrum band module 1270 described with reference to FIG. 12, and/or the processor 1440 and related components described with reference to FIG. 14.

At block 1515, a second CCA procedure is performed, upon a successful completion of the first CCA procedure, to determine availability of the radio frequency spectrum band, the second CCA procedure performed during a DTX period in the transmission period. The DTX period in the transmission period may be determined based on characteristics of one or more priority systems that may use the radio frequency spectrum band, such as characteristics of a radar system that may use the radio frequency spectrum band, for example. The operation(s) at block 1515 may in some cases be performed using the CCA module 1120 and/or 1160 in conjunction with receiver modules 1110 and 1112 and transmitter modules 1130 and 1132, described with reference to FIGS. 11A and/or 11B, DTX period determination module 1175 and second CCA module 1180 described with reference to FIG. 11B, the base station shared RF spectrum band module 1270 in conjunction with transceiver module(s) 1255 and antenna(s) 1260, described with reference to FIG. 12, and/or the processor 1440 and related components described with reference to FIG. 14.

Thus, the method 1500 may provide for wireless communications in which a contention-based channel access procedure may provide a winner of channel contention with access to a radio frequency spectrum band for a transmission period, and the winner of the channel may then monitor the radio frequency spectrum band periodically to determine continued availability. It should be noted that the method 1500 is just one implementation and that the operations of the method 1500 may be rearranged or otherwise modified such that other implementations are possible.

Figure 16:
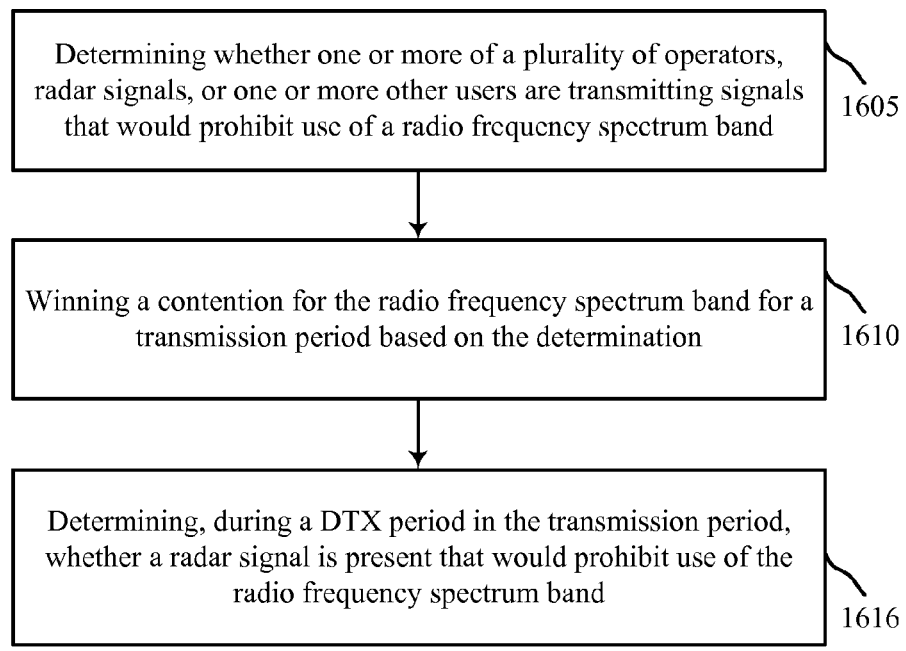
FIG. 16 is a flowchart conceptually illustrating an example of a method of wireless communication, in accordance with aspects of the present disclosure.

FIG. 16 is a flowchart conceptually illustrating an example of a method of wireless communication, in accordance with aspects of the present disclosure. For clarity, the method 1600 is described below with reference to ones of the access points, base stations, eNBs or devices 105, 205, 305, 1105, 1155, 1205 and/or 1405 described with reference to FIGS. 1, 2, 3, 11A, 11B, 12, and/or 14. In one example, a base station may execute one or more sets of codes to control the functional elements of the base station to perform the functions described below.

At block 1605, a determination is made whether one or more of a plurality of operators, radar signals, or one or more other users are transmitting signals that would prohibit use of a radio frequency spectrum band. The operation(s) at block 1605 may in some cases be performed using the CCA module 1120 and/or 1160 in conjunction with receiver modules 1110 and 1112 and transmitter modules 1130 and 1132, described with reference to FIGS. 11A and/or 11B, first CCA module 1165 described with reference to FIG. 11B, the base station shared RF spectrum band module 1270 in conjunction with transceiver module(s) 1255 and antenna(s) 1260, described with reference to FIG. 12, and/or the processor 1440 and related components described with reference to FIG. 14.

At block 1610, a contention is won for the radio frequency spectrum band for a transmission period based on the determination. The operation(s) at block 1610 may in some cases be performed using the CCA module 1120 and/or 1160 described with reference to FIGS. 11A and/or 11B, first CCA module 1165 described with reference to FIG. 11B, the base station shared RF spectrum band module 1270 described with reference to FIG. 12, and/or the processor 1440 and related components described with reference to FIG. 14.

At block 1615, a determination is made, during a DTX period in the transmission period, whether a radar signal is present that would prohibit use of the radio frequency spectrum band. The operation(s) at block 1615 may in some cases be performed using the CCA module 1120 and/or 1160 in conjunction with receiver modules 1110 and 1112 and transmitter modules 1130 and 1132, described with reference to FIGS. 11A and/or 11B, DTX period determination module 1175 and second CCA module 1180 described with reference to FIG. 11B, the base station shared RF spectrum band module 1270 in conjunction with transceiver module(s) 1255 and antenna(s) 1260, described with reference to FIG. 12, and/or the processor 1440 and related components described with reference to FIG. 14.

Thus, the method 1600 may provide for wireless communications in which CCA operations may be modified to be performed at different times for a UE based on whether an associated base station has gained channel access to a wireless communication channel in an unlicensed radio frequency spectrum band. It should be noted that the method 1600 is just one implementation and that the operations of the method 1600 may be rearranged or otherwise modified such that other implementations are possible.

Figure 17:
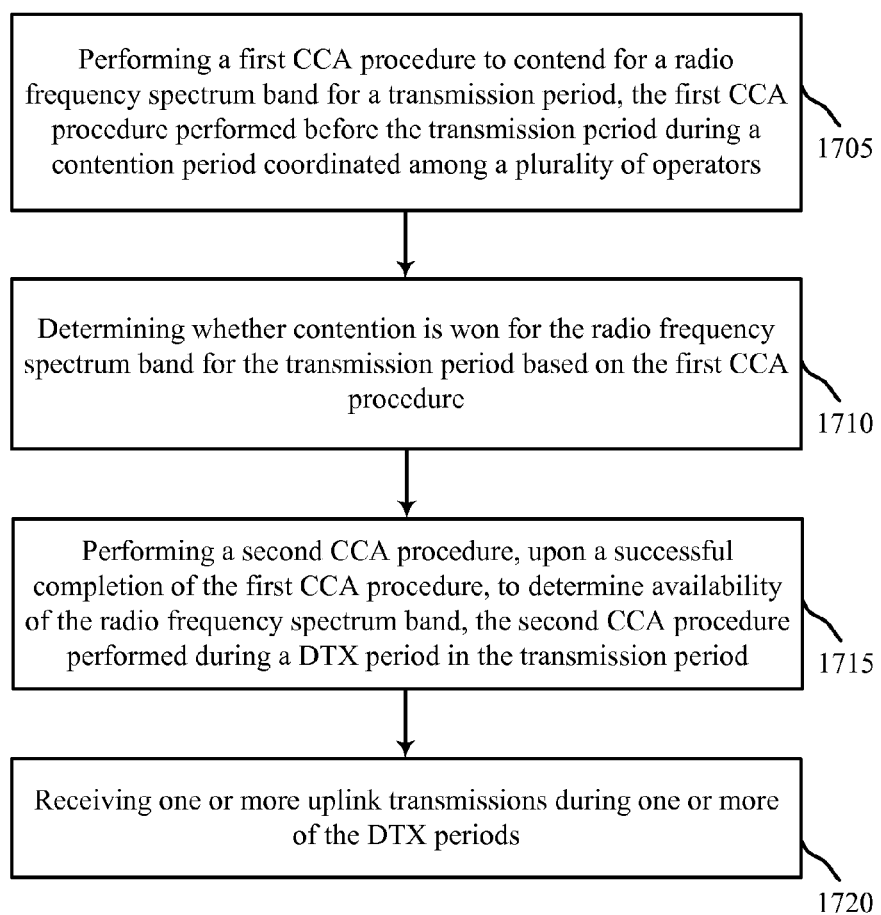
FIG. 17 is a flowchart conceptually illustrating an example of a method of wireless communication, in accordance with aspects of the present disclosure.

FIG. 17 is a flowchart conceptually illustrating an example of a method of wireless communication, in accordance with aspects of the present disclosure. For clarity, the method 1700 is described below with reference to ones of the access points, base stations, eNBs or devices 105, 205, 305, 1105, 1155, 1205 and/or 1405 described with reference to FIGS. 1, 2, 3, 11A, 11B, 12, and/or 14. In one example, a base station may execute one or more sets of codes to control the functional elements of the base station to perform the functions described below.

At block 1705, a first CCA procedure is performed to contend for a radio frequency spectrum band for a transmission period, the first CCA procedure performed before the transmission period during a contention period coordinated among a plurality of operators. In some examples, the base stations or the same and/or different operators may be coordinated to perform contention-based channel access to the radio frequency spectrum band. If a base station does not win contention, the base station may again attempt to win the channel in a next contention period coordinated among the plurality of operators. According to some examples, the contention period coordinated among the plurality of operators may be a special subframe that is synchronized with an LTE frame boundary. The operation(s) at block 1705 may in some cases be performed using the CCA module 1120 and/or 1160 in conjunction with receiver modules 1110 and 1112 and transmitter modules 1130 and 1132, described with reference to FIGS. 11A and/or 11B, first CCA module 1165 described with reference to FIG. 11B, the base station shared RF spectrum band module 1270 in conjunction with transceiver module(s) 1255 and antenna(s) 1260, described with reference to FIG. 12, and/or the processor 1440 and related components described with reference to FIG. 14.

At block 1710, it is determined that the contention was won for the radio frequency spectrum band for the transmission period based on the first CCA procedure. In some examples, a CUBS may be monitored and used to determine that the radio frequency spectrum band has or has not been obtained by another base station, and a CUBS transmitted when it is determined that the radio frequency spectrum band is available. The operation(s) at block 1710 may in some cases be performed using the CCA module 1120 and/or 1160 described with reference to FIGS. 11A and/or 11B, first CCA module 1165 described with reference to FIG. 11B, the base station shared RF spectrum band module 1270 described with reference to FIG. 12, and/or the processor 1440 and related components described with reference to FIG. 14.

At block 1715, a second CCA procedure is performed, upon a successful completion of the first CCA procedure, to determine availability of the radio frequency spectrum band, the second CCA procedure performed during a DTX period in the transmission period. The DTX period in the transmission period may be determined based on characteristics of one or more priority systems that may use the radio frequency spectrum band, such as characteristics of a radar system that may use the radio frequency spectrum band, for example. The operation(s) at block 1715 may in some cases be performed using the CCA module 1120 and/or 1160 in conjunction with receiver modules 1110 and 1112 and transmitter modules 1130 and 1132, described with reference to FIGS. 11A and/or 11B, DTX period determination module 1175 and second CCA module 1180 described with reference to FIG. 11B, the base station shared RF spectrum band module 1270 in conjunction with transceiver module(s) 1255 and antenna(s) 1260, described with reference to FIG. 12, and/or the processor 1440 and related components described with reference to FIG. 14.

At block 1720, one or more uplink transmissions are received during one or more of the DTX periods. The operation(s) at block 1720 may in some cases be performed using the receiver modules 1110 and 1112, described with reference to FIGS. 11A and/or 11B, the base station shared RF spectrum band module 1270 in conjunction with transceiver module(s) 1255 and antenna(s) 1260, described with reference to FIG. 12, and/or the processor 1440 and related components described with reference to FIG. 14.

Thus, the method 1700 may provide for wireless communications in which a contention-based channel access procedure may provide a winner of channel contention with access to a radio frequency spectrum band for a transmission period. The winner of the channel may then monitor the radio frequency spectrum band periodically in DTX periods to determine continued availability, and may receive uplink transmissions during one or more DTX periods while monitoring. It should be noted that the method 1700 is just one implementation and that the operations of the method 1700 may be rearranged or otherwise modified such that other implementations are possible.

Figure 18:
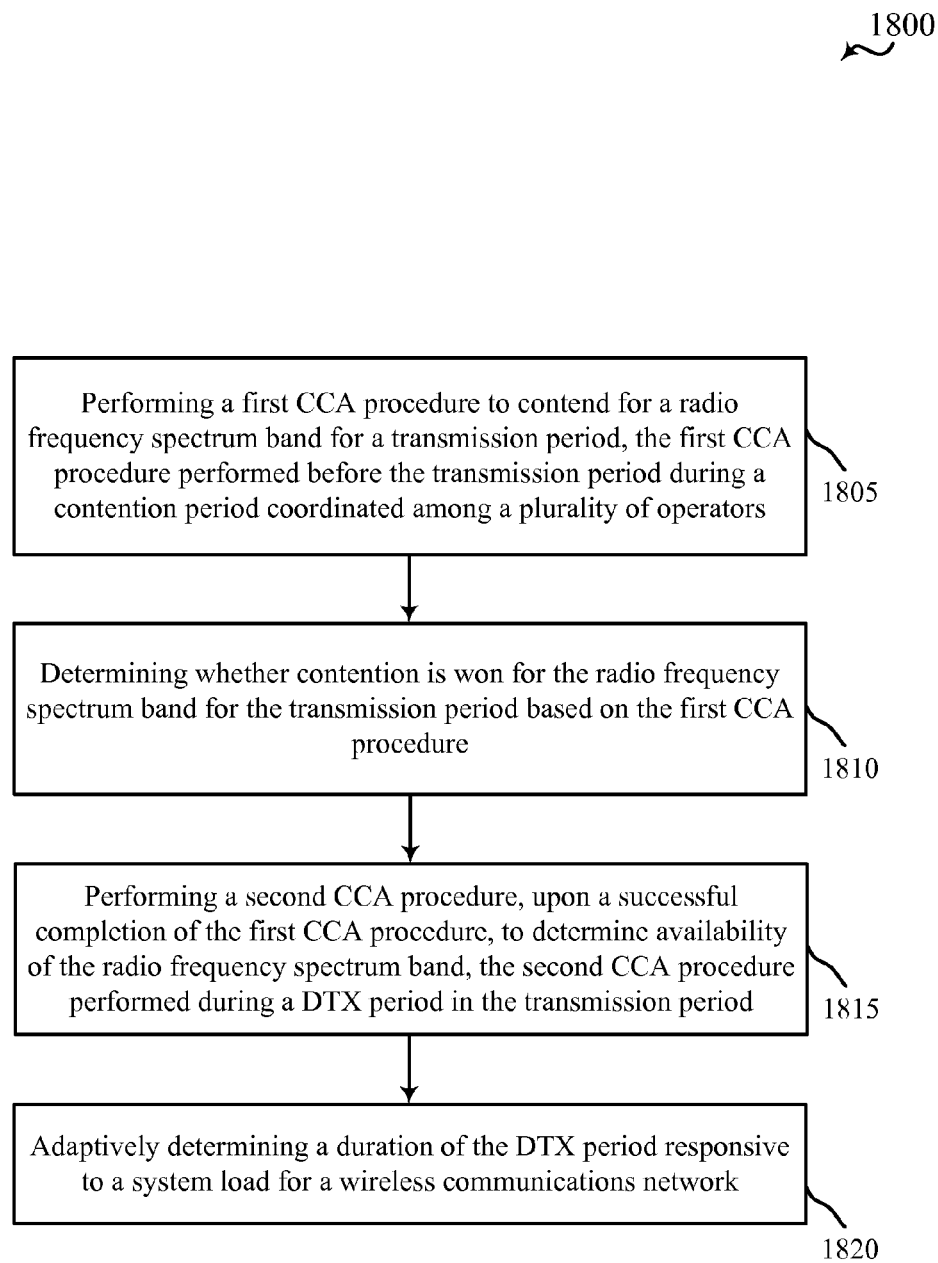
FIG. 18 is a flowchart conceptually illustrating an example of a method of wireless communication, in accordance with aspects of the present disclosure.

FIG. 18 is a flowchart conceptually illustrating an example of a method of wireless communication, in accordance with aspects of the present disclosure. For clarity, the method 1800 is described below with reference to ones of the access points, base stations, eNBs or devices 105, 205, 305, 1105, 1155, 1205 and/or 1405 described with reference to FIGS. 1, 2, 3, 11A, 11B, 12, and/or 14. In one example, a base station may execute one or more sets of codes to control the functional elements of the base station to perform the functions described below.

At block 1805, a first CCA procedure is performed to contend for a radio frequency spectrum band for a transmission period, the first CCA procedure performed before the transmission period during a contention period coordinated among a plurality of operators. In some examples, the base stations or the same and/or different operators may be coordinated to perform contention-based channel access to the radio frequency spectrum band. If a base station does not win contention, the base station may again attempt to win the channel in a next contention period coordinated among the plurality of operators. According to some examples, the contention period coordinated among the plurality of operators may be a special subframe that is synchronized with an LTE frame boundary. The operation(s) at block 1805 may in some cases be performed using the CCA module 1120 and/or 1160 in conjunction with receiver modules 1110 and 1112 and transmitter modules 1130 and 1132, described with reference to FIGS. 11A and/or 11B, first CCA module 1165 described with reference to FIG. 11B, the base station shared RF spectrum band module 1270 in conjunction with transceiver module(s) 1255 and antenna(s) 1260, described with reference to FIG. 12, and/or the processor 1440 and related components described with reference to FIG. 14.

At block 1810, it is determined that the contention was won for the radio frequency spectrum band for the transmission period based on the first CCA procedure. In some examples, a CUBS may be monitored and used to determine that the radio frequency spectrum band has or has not been obtained by another base station, and a CUBS transmitted when it is determined that the radio frequency spectrum band is available. The operation(s) at block 1810 may in some cases be performed using the CCA module 1120 and/or 1160 described with reference to FIGS. 11A and/or 11B, first CCA module 1165 described with reference to FIG. 11B, the base station shared RF spectrum band module 1270 described with reference to FIG. 12, and/or the processor 1440 and related components described with reference to FIG. 14.

At block 1815, a second CCA procedure is performed, upon a successful completion of the first CCA procedure, to determine availability of the radio frequency spectrum band, the second CCA procedure performed during a DTX period in the transmission period. The DTX period in the transmission period may be determined based on characteristics of one or more priority systems that may use the radio frequency spectrum band, such as characteristics of a radar system that may use the radio frequency spectrum band, for example. The operation(s) at block 1815 may in some cases be performed using the CCA module 1120 and/or 1160 in conjunction with receiver modules 1110 and 1112 and transmitter modules 1130 and 1132, described with reference to FIGS. 11A and/or 11B, DTX period determination module 1175 and second CCA module 1180 described with reference to FIG. 11B, the base station shared RF spectrum band module 1270 in conjunction with transceiver module(s) 1255 and antenna(s) 1260, described with reference to FIG. 12, and/or the processor 1440 and related components described with reference to FIG. 14.

At block 1820, an adaptive determination of a duration of the DTX period is made, responsive to a system load for a wireless communications network. According to some examples, at lighter system loads, relatively less traffic is transmitted using the system and additional opportunities to detect signals are provided, and one or more DTX periods may be reduced. In some examples, the DTX period(s) may be reduced to one or two OFDM symbols. In cases where system loads are high, opportunities to detect other signals on the radio frequency spectrum band are reduced, and the DTX period(s) are increased to enhance the likelihood of detecting such signals if they are present. In still other examples, an elapsed time since a last signal detection of a particular signal is maintained, and one or more DTX period(s) are reduced when the elapsed time exceeds a threshold number. The operation(s) at block 1820 may in some cases be performed using the CCA module 1120 and/or 1160 described with reference to FIGS. 11A and/or 11B, DTX period determination module 1175 and second CCA module 1180 described with reference to FIG. 11B, the base station shared RF spectrum band module 1270 described with reference to FIG. 12, and/or the processor 1440 and related components described with reference to FIG. 14.

Thus, the method 1800 may provide for wireless communications in which a contention-based channel access procedure may provide a winner of channel contention with access to a radio frequency spectrum band for a transmission period. The winner of the channel may then monitor the radio frequency spectrum band periodically in DTX periods to determine continued availability, and may receive uplink transmissions during one or more DTX periods while monitoring. It should be noted that the method 1800 is just one implementation and that the operations of the method 1800 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure.

Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   performing a first clear channel assessment (CCA) procedure to contend for a radio frequency spectrum band for a transmission period, wherein the first CCA procedure is performed before the transmission period during a contention period coordinated among a plurality of operators;
   determining whether contention is won for the radio frequency spectrum band for the transmission period based on the first CCA procedure; and
   performing a second CCA procedure, upon a successful completion of the first CCA procedure, to determine availability of the radio frequency spectrum band, wherein the second CCA procedure is performed during a discontinuous transmission (DTX) period in the transmission period.

2. The method of claim 1, further comprising:
   transmitting over the radio frequency spectrum band during a portion of the transmission period following the DTX period based on the performance of the second CCA procedure.

3. The method of claim 1, wherein the plurality of operators are assigned a priority index to contend for the radio frequency spectrum at predetermined times during the contention period.

4. The method of claim 3, wherein only a winning operator of the plurality of operators contends for the radio frequency spectrum band during the DTX period.

5. The method of claim 1, wherein the performing the first CCA procedure determines whether one or more of the plurality of operators, radar signals, or one or more other users are transmitting signals that would prohibit use of the radio frequency spectrum band.

6. The method of claim 1, wherein the performing the second CCA procedure comprises determining whether a radar signal is present that would prohibit use of the radio frequency spectrum band.

7. The method of claim 6, wherein performing the second CCA procedure further comprises determining whether another user won the radio frequency spectrum band during the DTX period.

8. The method of claim 1, wherein performing the second CCA procedure comprises performing CCA procedures during each of a plurality of DTX periods in the transmission period.

9. The method of claim 8, wherein the plurality of DTX periods occur at a periodicity in the transmission period.

10. The method of claim 9, wherein the periodicity is based at least in part on one or more characteristics of signals using the radio frequency spectrum band.

11. The method of claim 9, wherein the periodicity is based on a signal type of a geographic region and comprises a 0.5 millisecond DTX period for every 2 milliseconds during the transmission period.

12. The method of claim 9, wherein the periodicity is based on a Federal Communications Commission (FCC) radar type 2, 3, or 4 radar transmission.

13. The method of claim 9, wherein the periodicity is based on a signal type of a geographic region and comprises a 2.0 millisecond DTX period for every 7.5 milliseconds during the transmission period.

14. The method of claim 9, wherein the periodicity is based on a FCC radar type 1 or 5 radar transmission.

15. The method of claim 9, wherein the periodicity is based on a signal type of a geographic region and comprises a 5.0 millisecond DTX period for every 13.5 milliseconds during two consecutive transmission periods.

16. The method of claim 9, wherein the periodicity is based on a European Telecommunications Standards Institute (ETSI) radar type 1, 2 or 5 radar transmission.

17. The method of claim 1, further comprising:
    transmitting a channel usage beacon signal (CUBS) over the radio frequency spectrum band when winning the contention for the radio frequency spectrum band prior to transmitting a first data subframe.

18. The method of claim 17, wherein one or more of rank indicator (RI) or channel state information (CSI) measurements are performed during the first data subframe.

19. The method of claim 17, wherein one or more of reference signal received power (RSRP) or reference signal received quality (RSRQ) measurements are performed during the first data subframe.

20. The method of claim 1, wherein performing the second CCA procedure comprises performing CCA procedures during each of a plurality of DTX periods in the transmission period, and wherein one or more of the plurality of DTX periods comprises multiple consecutive subframes in the transmission period.

21. The method of claim 1, further comprising receiving one or more uplink transmissions during one or more of DTX periods.

22. The method of claim 1, wherein a duration of the DTX period is adaptively determined responsive to a system load for a wireless communications network.

23. The method of claim 22, wherein the duration of the DTX period is indicated in a resource grant.

24. The method of claim 1, wherein the plurality of operators operate a set of coordinated nodes operating according to a protocol used in the radio frequency spectrum band.

25. An apparatus for wireless communications, comprising:
    at least one processor; and
    a memory communicatively coupled with the at least one processor, wherein the at least one processor is configured to execute code stored on the memory to:
      perform a first clear channel assessment (CCA) procedure to contend for a radio frequency spectrum band for a transmission period, wherein the first CCA procedure is performed before the transmission period during a contention period coordinated among a plurality of operators;
      determine whether contention is won for the radio frequency spectrum band for the transmission period based on the first CCA procedure; and
      perform a second CCA procedure, upon a successful completion of the first CCA procedure, to determine availability of the radio frequency spectrum band, wherein the second CCA procedure is performed during a discontinuous transmission (DTX) period in the transmission period.

26. The apparatus of claim 25, wherein the at least one processor is configured to execute code stored on the memory to transmit over the radio frequency spectrum band during a portion of the transmission period following the DTX period based on the performance of the second CCA procedure.

27. The apparatus of claim 25, wherein the first CCA procedure determines whether one or more of the plurality of operators, radar signals, or one or more other users are transmitting signals that would prohibit use of the radio frequency spectrum band.

28. The apparatus of claim 25, wherein the second CCA procedure determines whether a radar signal is present that would prohibit use of the radio frequency spectrum band.

29. An apparatus for wireless communications, comprising:
- means for performing a first clear channel assessment (CCA) procedure to contend for a radio frequency spectrum band for a transmission period, wherein the first CCA procedure is performed before the transmission period during a contention period coordinated among a plurality of operators;
- means for determining whether contention is won for the radio frequency spectrum band for the transmission period based on the first CCA procedure; and
- means for performing a second CCA procedure, upon a successful completion of the first CCA procedure, to determine availability of the radio frequency spectrum band, wherein the second CCA procedure is performed during a discontinuous transmission (DTX) period in the transmission period.

30. A non-transitory computer-readable medium storing computer-executable code for wireless communications, the code executable by a processor to:
- perform a first clear channel assessment (CCA) procedure to contend for a radio frequency spectrum band for a transmission period, wherein the first CCA procedure is performed before the transmission period during a contention period coordinated among a plurality of operators;
- determine whether contention is won for the radio frequency spectrum band for the transmission period based on the first CCA procedure; and
- perform a second CCA procedure, upon a successful completion of the first CCA procedure, to determine availability of the radio frequency spectrum band, wherein the second CCA procedure is performed during a discontinuous transmission (DTX) period in the transmission period.

\* \* \* \* \*